(12) United States Patent
Duncan et al.

(10) Patent No.: US 9,896,006 B2
(45) Date of Patent: Feb. 20, 2018

(54) RESTRAINT WEB PRE-TENSIONING AND SUSPENSION SEAT PULL-DOWN DEVICE

(71) Applicant: Indiana Mills & Manufacturing, Inc., Westfield, IN (US)

(72) Inventors: Michael Carr Duncan, Zionsville, IN (US); Douglas W. Bittner, Indianapolis, IN (US); Guy R. Dingman, Westfield, IN (US); Marius Magdun, Cicero, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 15/217,448

(22) Filed: Jul. 22, 2016

(65) Prior Publication Data

US 2018/0022244 A1  Jan. 25, 2018

(51) Int. Cl.
*B60N 2/427* (2006.01)
*B60N 2/50* (2006.01)
(Continued)

(52) U.S. Cl.
CPC ....... *B60N 2/42736* (2013.01); *B60N 2/0276* (2013.01); *B60N 2/4279* (2013.01); *B60R 22/1951* (2013.01); *B60N 2/502* (2013.01)

(58) Field of Classification Search
CPC .. B60N 2/0276; B60N 2/427; B60N 2/42736; B60N 2/4279; B60N 2/50; B60N 2/502; B60N 2/505; B60R 22/195; B60R 22/1951; B60R 22/1952; B60R 22/1954; B60R 22/1955; B60R 2022/1957
See application file for complete search history.

(56) References Cited

U.S. PATENT DOCUMENTS 5,295,714 A * 3/1994 Fohl ................... B60R 22/1951
                                                                                     180/268
5,639,120 A    6/1997 Kmiec et al.
(Continued)

FOREIGN PATENT DOCUMENTS

EP     2143596 A1 *  1/2010  ......... B60R 22/1951
GB     2375329 A  * 11/2002  ......... B60R 22/1955
(Continued)

OTHER PUBLICATIONS

International Search Report for Counterpart International Patent Application No. PCT/US2017/042711, dated Sep. 22, 2017.

*Primary Examiner* — Laura Freedman
(74) *Attorney, Agent, or Firm* — Barnes & Thornburg LLP

(57) ABSTRACT

A device is disclosed for pre-tensioning an occupant restraint harness coupled to a seat portion of a motor vehicle seat and/or for pulling down the seat portion of the vehicle seat toward a seat base in embodiments in which the seat portion is suspended above the seat base. An elongated housing is secured to the seat portion, a web is coupled between the restraint harness or seat portion and the seat base or a support structure to which the seat base is mounted, and a piston carried by the housing defines a web guide in contact with the web between its two ends. As the piston moves along and relative to the housing in response to actuation thereof, the web guide displaces the web within the housing to pre-tension the occupant restraint harness and/or to pull the seat portion toward the seat base.

18 Claims, 11 Drawing Sheets

(51) Int. Cl.
*B60R 22/195* (2006.01)
*B60N 2/02* (2006.01)

(56) References Cited

U.S. PATENT DOCUMENTS

| | | | | |
|---|---|---|---|---|
| 5,676,397 A * | 10/1997 | Bauer | ................ | B60R 22/1952 242/374 |
| 5,944,350 A * | 8/1999 | Grabowski | ......... | B60R 22/1952 280/806 |
| 6,036,274 A * | 3/2000 | Kohlndorfer | ....... | B60R 22/1951 280/806 |
| 6,039,353 A * | 3/2000 | Bauer | ................ | B60R 22/1952 188/374 |
| 6,076,887 A * | 6/2000 | Andersson | ........... | B60N 2/4235 297/216.1 |
| 6,089,605 A * | 7/2000 | Muller | ................ | B60N 2/4214 280/806 |
| 6,109,691 A * | 8/2000 | Gray | ................... | B60N 2/4214 297/216.17 |
| 6,135,380 A * | 10/2000 | Brown | ............... | B60R 22/1951 242/374 |
| 6,182,783 B1 * | 2/2001 | Bayley | ............... | B60G 17/0185 180/271 |
| 6,322,140 B1 * | 11/2001 | Jessup | ................ | B60N 2/4221 296/68.1 |
| 6,340,176 B1 * | 1/2002 | Webber | ............. | B60R 22/1952 280/805 |
| 6,419,271 B1 * | 7/2002 | Yamada | ............. | B60R 22/1952 280/801.1 |
| 6,481,777 B2 * | 11/2002 | Mans | ................. | B60N 2/4214 296/65.01 |
| 6,561,936 B1 | 5/2003 | Betz et al. | | |
| 7,188,868 B2 * | 3/2007 | Yamaguchi | ........... | B60R 22/195 280/806 |
| 7,976,066 B2 * | 7/2011 | Bok | ................... | B60R 22/1952 280/806 |
| 7,976,092 B2 * | 7/2011 | Meredith | ........... | B60N 2/42736 280/735 |
| 8,528,987 B2 * | 9/2013 | Cahill | ................ | B60R 22/1955 297/480 |
| 8,579,371 B2 * | 11/2013 | Masutani | ............. | B60N 2/4221 297/216.16 |
| 8,641,140 B2 * | 2/2014 | Swierczewski | .......... | B60N 2/06 297/216.1 |
| 9,126,555 B2 * | 9/2015 | Ver Hoven | ......... | B60R 22/1954 |
| 9,162,647 B2 * | 10/2015 | Inagawa | ................ | B60R 22/18 |
| 2006/0196715 A1 * | 9/2006 | Fujishiro | ............. | B60N 2/0276 180/271 |
| 2009/0045615 A1 | 2/2009 | Bell | | |
| 2012/0025588 A1 | 2/2012 | Humbert et al. | | |
| 2015/0021967 A1 * | 1/2015 | Tanaka | ............... | B60N 2/42763 297/311 |

FOREIGN PATENT DOCUMENTS

| | | | | |
|---|---|---|---|---|
| JP | | 07277139 A | 10/1995 | |
| JP | | 2009132253 A * | 6/2009 | ......... B60N 2/42763 |

* cited by examiner

RESTRAINT WEB PRE-TENSIONING AND SUSPENSION SEAT PULL-DOWN DEVICE

FIELD OF THE INVENTION

The present invention relates generally to restraint systems for motor vehicles, and more specifically to devices for pre-tensioning one or more motor vehicle seat restraint webs and/or for pulling down a motor vehicle suspension seat to a seat base and/or vehicle floor upon detection of an impending vehicle rollover and/or impact event.

BACKGROUND

Motor vehicle seat restraint systems typically include a multi-point restraint harness, made up of one or more restraint webs, coupled thereto. Some such restraint systems may further include a device or devices for pre-tensioning the restraint harness, i.e., for tightening the restraint harness about the seat occupant, under certain operating conditions such as during or in advance of a vehicle rollover and/or a vehicle impact event. In embodiments in which the motor vehicle seat is a suspension seat, i.e., a motor vehicle seat in which an occupant seat portion is suspended above a seat base by a suspension structure extending therebetween, such a device or devices may alternatively or additionally operate to pull the suspended seat portion downwardly toward the seat base under such conditions.

SUMMARY

The present invention may comprise one or more of the features recited in the attached claims, and/or one or more of the following features and combinations thereof. In a first aspect, a device for pre-tensioning an occupant restraint harness coupled to a motor vehicle seat, may comprise an elongated housing configured to be secured to the motor vehicle seat, a web having a first end configured to be coupled to the restraint harness and second end, opposite the first end, configured to be secured to one of the motor vehicle seat and a support structure to which the motor vehicle seat is mounted, and an elongated piston carried by the housing and defining a web guide at one end thereof in contact with the web between the first and second ends of the web, the piston moving along and relative to the housing in response to actuation thereof, the web guide of the moving piston displacing the web within the housing to pre-tension the occupant restraint harness.

A second example aspect includes the features of the first example aspect and may further include a cable having a first end secured to one of a buckle member and a tongue member releasably engageable with a corresponding one of a tongue member and a buckle member coupled to the restraint harness, and a second end, opposite the first end of the cable, extending into the housing, and a bracket disposed in and slidable relative to the housing, the bracket having a first end secured to the second end of the cable and a second end, opposite the first end of the bracket, secured to the first end of the web, the bracket slidable along and within the housing as the web guide of the moving piston displaces the web to retract the cable into the housing to pre-tension the restraint harness.

A third example aspect includes the features of the second example aspect wherein the bracket defines a slot therethrough having opposing terminal ends, and wherein the device may further include a stop member affixed to the housing and extending through the slot, the bracket slidable relative to the housing between a first position in which the stop member is in contact with one of the opposing terminal ends of the slot and a second position in which the stop member is in contact with the other of the opposing terminal ends, the bracket slidable between the first and second positions, as the web guide of the moving piston displaces the web, to pre-tension the restraint harness.

A fourth example aspect includes the features of any of the first through third example aspects, and further may include an elongated tube carried by the housing, the elongated tube having an open end and a closed end opposite the open end thereof, the tube sized to receive the elongated piston longitudinally therein via the open end of the tube, a seal disposed about the elongated piston, and an airtight space defined within the tube between the closed end thereof and the seal disposed about the elongated piston, wherein the piston is forced out of the tube in response to increased pressure within the space.

A fifth example aspect includes the features of the fourth example aspect, wherein the elongated piston contains pressurized gas and defines an orifice at an end thereof opposite the end defining the web guide, the orifice open to the space defined within the tube, and wherein the device may further include an actuator responsive to an activation signal to cause the piston to expel the pressurized gas from the orifice into the space to thereby force the piston out of the tube.

A sixth example aspect includes the features of the fifth example aspect and may further include a sensor configured to produce one of a roll signal and an impact signal, a processor, and a memory unit having instructions stored therein which, when executed by the processor, cause the processor to process the one of the roll signal and the impact signal and to produce the activation signal if the corresponding one of the roll signal indicates an imminent roll condition of a motor vehicle in which the vehicle seat is mounted and the impact signal indicates an imminent impact of the motor vehicle.

In a seventh example aspect, a device for pre-tensioning an occupant restraint harness coupled to a seat portion of a motor vehicle seat suspended above a seat base coupled to a support structure of a motor vehicle and for pulling down the suspended seat portion of the vehicle seat toward the seat base, may comprise an elongated housing configured to be secured to the suspended seat portion of the motor vehicle seat, a web having a first end configured to be coupled to the restraint harness and second end, opposite the first end, configured to be secured to one of the seat base and a support structure to which the seat base is mounted, and an elongated piston carried by the housing and defining a web guide at one end thereof in contact with the web between the first and second ends of the web, the piston moving along and relative to the housing in response to actuation thereof, the web guide of the moving piston displacing the web within the housing to first pre-tension the occupant restraint harness and to then pull the suspended seat portion toward the seat base.

An eighth example aspect includes the features of the seventh example aspect and may further include a bracket disposed in and slidable relative to the housing, the bracket having a first end configured to be coupled to the restraint harness and a second end, opposite the first end of the bracket, secured to the first end of the web, the bracket slidable along and within the housing as the web guide of the moving piston displaces the web from a first bracket position relative to the housing to a second bracket position relative to the housing to thereby pre-tension the restraint harness, and wherein continued movement of the piston along and within the housing with the bracket in the second bracket position causes the web guide to further displace the web to pull the suspended seat portion toward the seat base.

A ninth example aspect includes the features of the eighth example aspect, wherein the bracket defines a slot therethrough having opposing terminal ends, and wherein the device may further include a stop member affixed to the housing and extending through the slot, the bracket slidable relative to the housing between the first bracket position in which the stop member is in contact with one of the opposing terminal ends of the slot and the second bracket position in which the stop member is in contact with the other of the opposing terminal ends, the stop member fixing the bracket in the second bracket position so that the continued movement of the piston along and within the housing with the bracket fixed in the second bracket position causes the web guide to further displace the web to pull the suspended seat portion toward the seat base.

A tenth example aspect includes the features of any of the seventh through ninth example aspects and may further include a collar attached to and within the housing, the collar in contact with the web between the web guide and the second end of the web, the web guide and collar together defining a loop via which the web passes in opposite directions within the housing.

An eleventh example aspect includes the features of the eighth example aspect and may further include a cable having a first end secured to one of a buckle member and a tongue member releasably engageable with a corresponding one of a tongue member and a buckle member coupled to the restraint harness, and a second end, opposite the first end of the cable, extending into the housing, the first end of the bracket secured to the second end of the cable.

A twelfth example aspect includes the features of any of the seventh through eleventh aspects and may further include an elongated tube carried by the housing, the elongated tube having an open end and a closed end opposite the open end thereof, the tube sized to receive the elongated piston longitudinally therein via the open end of the tube, a seal disposed about the elongated piston, and an airtight space defined within the tube between the closed end thereof and the seal disposed about the elongated piston, wherein the piston is forced out of the tube in response to increased pressure within the space.

A thirteenth example aspect includes the features of the twelfth example aspect wherein the elongated piston contains pressurized gas and defines an orifice at an end thereof opposite the end defining the web guide, the orifice open to the space defined within the tube, and wherein the device may further include an actuator responsive to an activation signal to cause the piston to expel the pressurized gas from the orifice into the space to thereby force the piston out of the tube.

A fourteenth example aspect includes the features of the thirteenth example aspect and may further include a sensor configured to produce one of a roll signal and an impact signal, a processor, and a memory unit having instructions stored therein which, when executed by the processor, cause the processor to process the one of the roll signal and the impact signal and to produce the activation signal if the corresponding one of the roll signal indicates an imminent roll condition of a motor vehicle in which the vehicle seat is mounted and the impact signal indicates an imminent impact of the motor vehicle.

In a fifteenth example aspect, a device for pulling down a seat portion of a motor vehicle seat toward a seat base coupled to a support structure of a motor vehicle, the seat portion suspended above the seat base, may comprise an elongated housing configured to be secured to the suspended seat portion of the motor vehicle seat, a web having a first end fixed to the suspended seat portion and second end, opposite the first end, configured to be secured to one of the seat base and a support structure to which the seat base is mounted, and an elongated piston carried by the housing and defining a web guide at one end thereof in contact with the web between the first and second ends of the web, the piston moving along and relative to the housing in response to actuation thereof, the web guide of the moving piston displacing the web within the housing to pull the suspended seat portion toward the seat base.

A sixteenth example aspect includes the features of the fifteenth example aspect and may further include a collar attached to and within the housing, the collar in contact with the web between the web guide and the second end of the web, the web guide and collar together defining a loop via which the web passes in opposite directions within the housing A seventeenth example aspect includes the features of either of the fifteenth and sixteenth example aspects and may further include an elongated tube carried by the housing, the elongated tube having an open end and a closed end opposite the open end thereof, the tube sized to receive the elongated piston longitudinally therein via the open end of the tube, a seal disposed about the elongated piston, and an airtight space defined within the tube between the closed end thereof and the seal disposed about the elongated piston, wherein the elongated piston contains pressurized gas and defines an orifice at an end thereof opposite the end defining the web guide, the orifice open to the space defined within the tube, and wherein the device further comprises an actuator responsive to an activation signal to cause the piston to expel the pressurized gas from the orifice into the space to thereby force the piston out of the tube.

An eighteenth example aspect includes the features of the seventeenth example aspect and may further include a sensor configured to produce one of a roll signal and an impact signal, a processor, and a memory unit having instructions stored therein which, when executed by the processor, cause the processor to process the one of the roll signal and the impact signal and to produce the activation signal if the corresponding one of the roll signal indicates an imminent roll condition of a motor vehicle in which the vehicle seat is mounted and the impact signal indicates an imminent impact of the motor vehicle.

In a nineteenth example aspect, a system for pre-tensioning a motor vehicle occupant restraint harness, may comprise a motor vehicle seat having a seat portion coupled to a seat base, the seat base configured to be mounted to a support structure within a motor vehicle, an occupant restraint harness coupled to the motor vehicle seat, an elongated housing secured to the seat portion of the motor vehicle seat, a web having a first end extending into the housing and coupled to the restraint harness and second end, opposite the first end, secured to one of the seat base and the support structure, a piston carried by the housing and having a web guide in contact with the web between the first and second ends of the web, an actuator responsive to an activation signal to actuate the piston to cause the piston and web guide to move within and relative to the housing to pre-tension the occupant restraint harness by displacing the web, a sensor configured to produce one of a roll signal and an impact signal, a processor, and a memory unit having instructions stored therein which, when executed by the processor, cause the processor to process the one of the roll signal and the impact signal and to produce the activation signal if the corresponding one of the roll signal indicates an imminent roll condition of a motor vehicle in which the vehicle seat is mounted and the impact signal indicates an imminent impact of the motor vehicle.

A twentieth example aspect includes the features of the nineteenth example aspect wherein the seat portion is suspended above the seat base, and wherein the system may further include a bracket disposed in and slidable relative to the housing, the bracket having a first end coupled to the restraint harness and a second end, opposite the first end of the bracket, secured to the first end of the web, the bracket slidable along and within the housing as the web guide of the moving piston displaces the web from a first bracket position relative to the housing to a second bracket position relative to the housing to thereby pre-tension the restraint harness, and wherein continued movement of the piston along and within the housing with the bracket in the second bracket position causes the web guide to further displace the web to pull the suspended seat portion toward the seat base.

A twenty first example aspect includes the features of either of the nineteenth and twentieth example aspects, wherein the piston is an elongated piston, and wherein the system may further include an elongated tube carried by the housing, the elongated tube having an open end and a closed end opposite the open end thereof, the tube sized to receive the elongated piston longitudinally therein via the open end of the tube, a seal disposed about the elongated piston, and an airtight space defined within the tube between the closed end thereof and the seal disposed about the elongated piston, wherein the elongated piston contains pressurized gas and defines an orifice at an end thereof opposite the end defining the web guide, the orifice open to the space defined within the tube, and wherein the actuator is responsive to the activation signal to cause the piston to expel the pressurized gas from the orifice into the space to thereby force the piston out of the tube.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

DETAILED DESCRIPTION OF THE DRAWING

Figure 1:
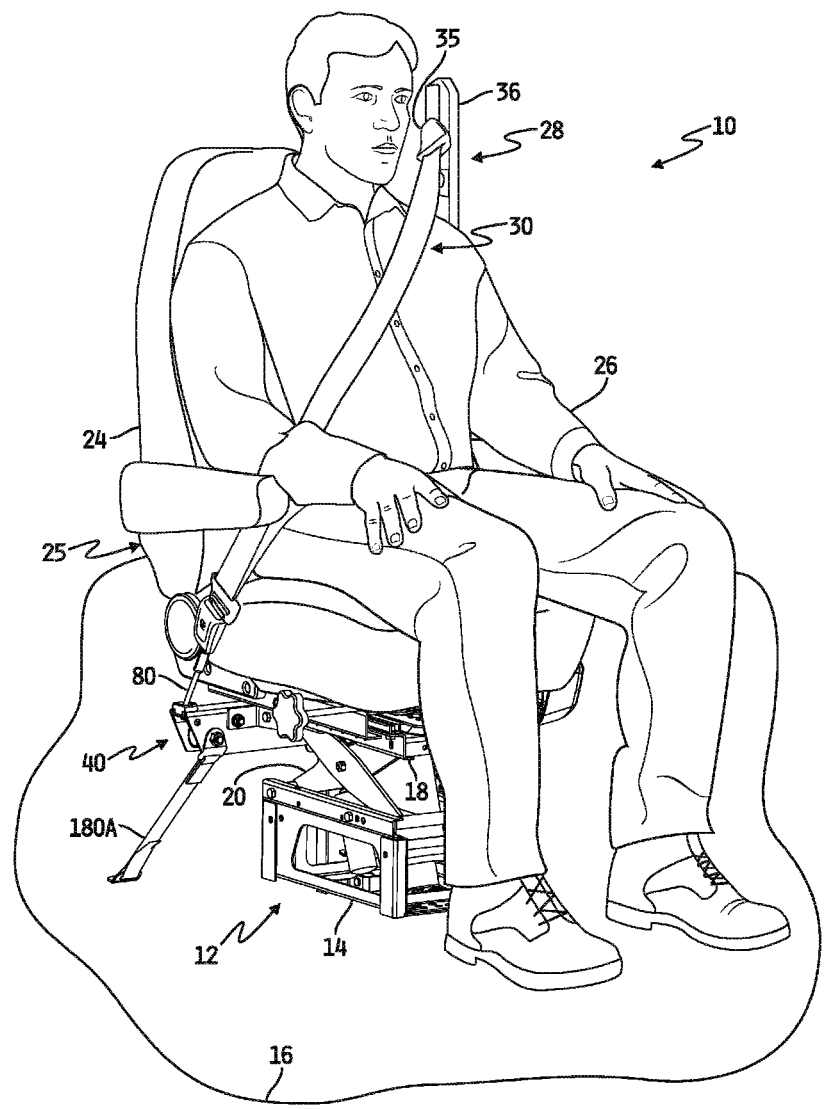
FIG. 1 is a front perspective view of a suspension seat for a motor vehicle including a vehicle seat restraint system and an embodiment of a restraint web pre-tensioning and suspension seat pull-down device.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Referring now to FIG. 1, an embodiment is shown of a motor vehicle seat restraint system 10 including an occupant seat 12, mounted to the floor 16 or other support surface of a motor vehicle, to which a restraint system 28 is mounted and to which an embodiment of a restraint web pre-tensioning and/or suspension seat pull-down device 40 is also mounted. The device 40 is illustratively part of a vehicle rollover and/or impact detection and safety system operable to pre-tension a restraint web 30 of the restraint system 28 upon detection of an impending vehicle impact and/or rollover event. In embodiments in which the motor vehicle seat 12 is a suspension seat, as illustrated in FIG. 1, the device 40 is alternatively or additionally operable, upon detection of an impending vehicle impact and/or rollover event, to pull the suspension seat down to or adjacent to a seat base of the suspension seat and/or to or adjacent to the floor 16 of the motor vehicle in which the seat 12 is mounted. It will be understood, however, that although the vehicle seat 12 is illustrated in FIGS. 1 and 7A-7C as a suspension seat, this disclosure contemplates embodiments in which the motor vehicle seat 12 is not a suspension seat but is instead rigidly affixed to the floor 16 of the motor vehicle, and in such embodiments the device 40 is operable only to pre-tension the restraint web 30 upon detection of an impending vehicle impact and/or rollover event and therefore is not operable to pull the vehicle seat 12 to or toward the seat base and/or floor 16.

The motor vehicle in which the motor vehicle 12 seat is mounted may be any conventional motor vehicle, examples of which include, but are not limited to, an emergency vehicle, such as a fire fighting or rescue vehicle, medical vehicle, security vehicle or the like, a light, medium or heavy-duty truck, an industrial vehicle, e.g., construction and/or mining equipment, farm equipment, excavation equipment and/or other heavy equipment, a lift truck, a recreational vehicle such as an all-terrain vehicle (ATV), dune buggy or other off-road vehicle, an automobile, an electric vehicle, a utility vehicle, a commercial vehicle, a racing vehicle, and the like.

In the embodiment illustrated in FIG. 1, the vehicle seat 12 is illustratively provided in the form of a conventional suspension seat having a seat base 14 mounted to the floor 16 of a motor vehicle, a seat frame 18 and a suspension mechanism 20 extending between and attached to the seat base 14 and the seat frame 18. The suspension mechanism 20 may be or include any conventional suspension mechanism configured and operable to suspend the seat frame 18 above seat base 14, examples of which include, but should not be limited to, air suspension mechanisms, mechanical suspension systems, pneumatic or hydraulic suspension systems, and the like. In any case, a seat cushion 22 is mounted to the seat frame 18 and a seat back 24 extends upwardly and away from a rear end of the seat frame 18 and cushion 22. In the illustrated embodiment, the seat frame 18, the seat cushion 22 mounted thereto and the seat back 24 together define a seat portion 25 of the vehicle seat 12, and an occupant 26 is shown seated in, and supported by, the seat portion 25 of the vehicle seat 12.

The motor vehicle seat restraint system 10 further includes a restraint system 28 including a multi-point occupant restraint harness 30. In the illustrated embodiment, the occupant restraint harness 30 is provided in the form of a conventional three-point restraint harness defined by a single web having a torso-engaging portion 32 and a lap-engaging portion 34. One end of the web 30 illustratively extends through a web guide 35 and into engagement with a conventional web retractor (not shown) mounted to the floor 16 of the motor vehicle or to the seat base 14. In the illustrated embodiment, the web guide 35 is mounted near the top end of a post or tower 36 having an opposite bottom end mounted to the floor 16 of the motor vehicle, and the web guide 35 is illustratively positioned relative to the post 36 so as to locate the web guide 35 above a shoulder of the seat occupant 26 that is proximate to the post 36 when the occupant 26 is seated in the vehicle seat 12. An opposite end of the web 30 is illustratively mounted, e.g., via a conventional web anchor (not shown), to the seat frame 18 on the side of the seat 12 that is adjacent to the post 36. Between the two ends, the web 30 extends through another web guide 38 which adjustably divides the web 30 into the torso-engaging portion 32, which extends across the torso of the occupant 26 between the web guides 35, 38, and the lap portion 34 which extends across the lap of the occupant 26 between the web guide 38 and the web anchor (not shown) attached to the seat frame 18 on the side of the seat 12 adjacent to the post 36.

The web guide 38 illustratively includes a conventional tongue member (not shown) that is configured to releasably engage a conventional buckle member 42 in a conventional manner. In alternate embodiments, the item 42 may represent a conventional tongue member, and the web guide 38 may include a conventional buckle member configured to releasably engage the tongue member 42. In any case, the buckle (or tongue) member 42 is illustratively coupled to a retractable cable 80 which extends into one end of the restraint web pre-tensioning and/or suspension seat pull-down device 40 and which is coupled to the device 40 as will be described in detail below. In some embodiments, the opposite end of the web 30 is coupled, e.g. via a conventional web anchor, to the opposite end of the restraint web pre-tensioning and/or suspension seat pull-down device 40. In any case, the restraint web pre-tensioning and/or suspension seat pull-down device 40 is rigidly mounted to the seat base 18, and a number of example mounting arrangements for mounting the device 40 to the seat base 18 are illustrated in FIGS. 4A-4D and will be described in detail below.

In some embodiments, the restraint web pre-tensioning and/or suspension seat pull-down device 40 may replace a conventional, so-called Integrated Connection Point (ICP) bar that may be mounted to the seat base 18 in substantially the same location as is the device 40. In other embodiments, the device 40 may be mounted to motor vehicle seats which do not typically have ICP bars mounted thereto, and in still other embodiments the device 40 may be mounted to motor vehicle seats designed, at least in part, to mount to the device 40.

In the embodiment illustrated in FIG. 1, the restraint system 28 is provided in the form of a conventional three-point restraint system including a single web 30 partitioned by a web guide 38 into a torso-engaging portion 32 and a lap-engaging portion 34. It will be understood, however, that in alternative embodiments the restraint harness 28 may be any conventional multi-point restraint system having more or fewer webs and/or more or fewer points of restraint, i.e. more or fewer web attachment or anchorage points, and it will be understood that all such alternative restraint harnesses are intended to fall within the scope of this disclosure.

Figure 2:
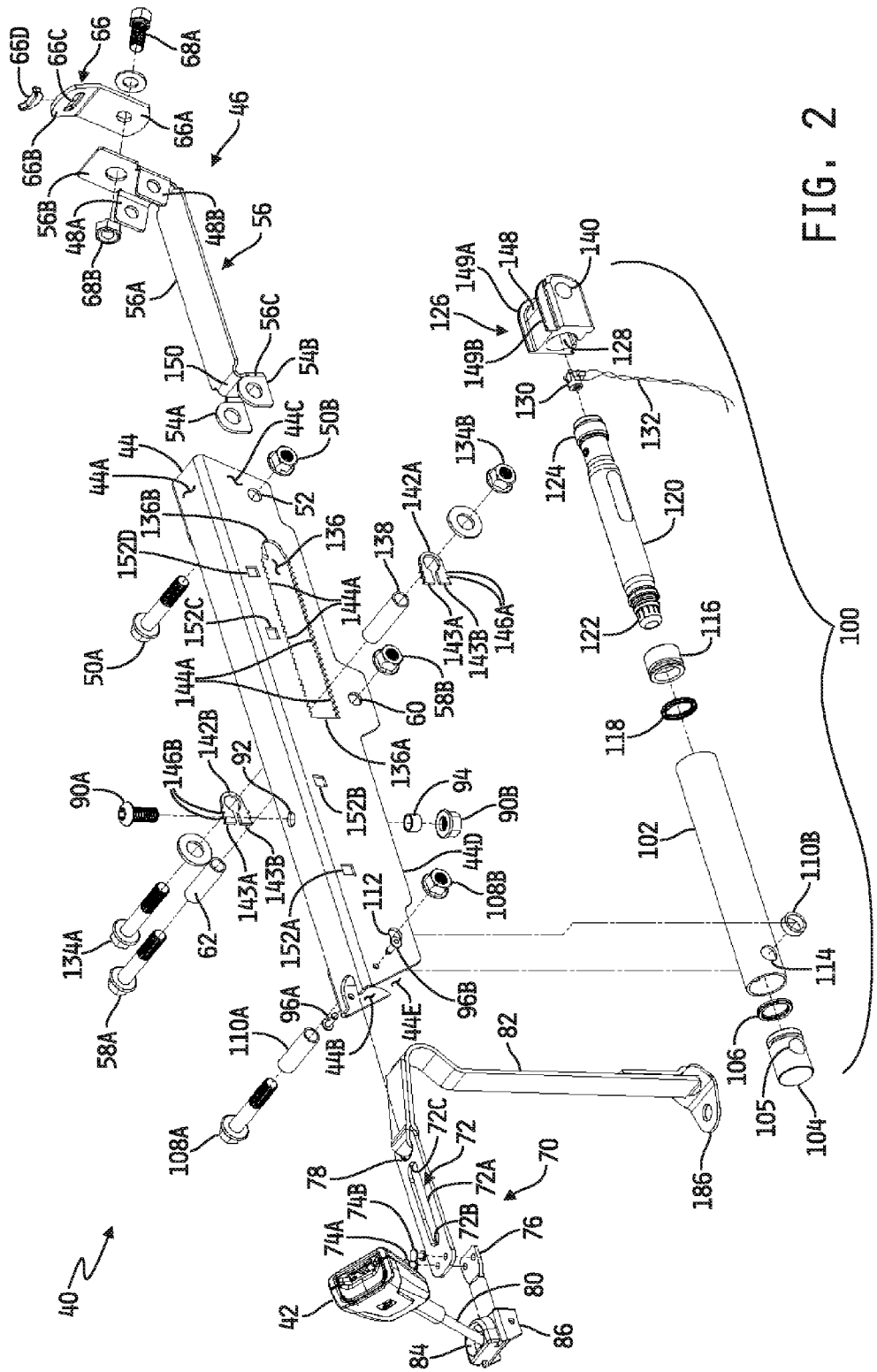
FIG. 2 is an exploded view of the restraint web pre-tensioning and suspension seat pulldown device illustrated in FIG. 1.

Referring now to FIG. 2, an exploded view is shown of the restraint web pre-tensioning and/or suspension seat pull-down device 40 illustrated in FIG. 1. It will be understood that the perspective illustrated in FIG. 2 is a rear, seat-facing view of the device 40, i.e., as viewed from the portion of the device 40 that is to be mounted to the rear of the vehicle seat 12, e.g., to a rear portion of the seat frame 18. In the illustrated embodiment, the device 40 illustratively includes a channel-shaped, e.g., C-shaped, U-shaped or similarly shaped, housing 44 having a top 44A and opposing side walls 44B, 44C extending downwardly away from the top 44A and an open underside 44D. The top 44A, side walls 44B, 44C and define a channel 44E therebetween that is accessible via the open underside 44D. The housing 44 is illustratively sized and configured to receive and have mounted therein a fixed bracket assembly 46, a sliding bracket assembly 70, and an inflator piston assembly 100. The housing 44 is illustratively rigid and in some embodiments is made of a lightweight sheet metal, although in other embodiments the housing 44 may alternatively be made or formed of one or more other suitable materials.

The fixed bracket assembly 46 illustratively includes a base member 56 having a first generally flat, planar and elongated base portion 56A coupled at one end to a second generally flat and planar base portion 56B and coupled at an opposite end to a third generally flat and planar base portion 56C. Illustratively, the base portions 56A and 56B define a generally obtuse angle therebetween and the base portions 56B and 56C illustratively define a substantially right angle therebetween. It will be understood, however, that the base portions 56A and 56B may alternatively define a non-obtuse angle therebetween, and the base portions 56B and 56C may alternatively define a non-right angle therebetween. In the illustrated embodiment, the base portions 56A, 56B and 56C are integral such that the base member 56 is of unitary construction, although in other embodiments one or more of the base portions 56A, 56B and 56C may be separate from but attached, mounted or affixed to the other base portion(s).

The base portion 56B illustratively has a pair of opposing tabs 48A, 48B each extending normally away from either side thereof. The tabs 48A, 48B each define an opening therethrough which aligns with the opposing opening and also with a corresponding opening 52 formed through the opposing walls 44B, 44C of the housing 44. The base portion 56C likewise illustratively has a pair of opposing tabs 54A, 54B each extending normally away from either side thereof. The tabs 54A, 54B each define an opening therethrough which aligns with the opposing opening and also with a corresponding opening 60 formed through the opposing walls 44B, 44C of the housing 44. A guide surface 150 is illustratively defined at the junction of the base member 56 between the base portions 56B and 56C.

Fixation members 50A, 50B and 58A, 58B cooperate with the pair of tabs 48A, 48B and 54A, 54B respectively to mount and affix the base member 56 of the bracket assembly 46 to the housing 44. In the illustrated embodiment, for example, the fixation members 50A and 58A are provided in the form of threaded bolts and the fixation members 50B and 58B are provided in the form of complementarily threaded nuts. The base member 56 of the bracket assembly 46 is illustratively affixed to the housing 44 by passing the bolt 50A through the openings 52, 48A, 48B from one side 44B of the housing 44 and advancing the nut 50B onto the bolt 50A from the opposite side 44C of the housing 44, and by passing the bolt 58A through the openings 60, 54A, 54B from one side 44B of the housing 44 and advancing the nut 58B onto the bolt 58A from the opposite side 44C of the housing 44. In other embodiments, the bolts 50A, 58A may pass through the housing 44 from the opposite side 44C, and in still other embodiments one or more other conventional fixation members may be alternatively or additionally used to mount and affix the base member 56 of the bracket assembly 46 to the housing 44.

In some embodiments, the bracket assembly 46 may further include a clip or tab 66 defining an opening through a lower body portion 66A of the tab or clip 66, and the opening defined therethrough aligns with an opening formed through the bracket portion 56B adjacent to the free end thereof. A threaded bolt 68A is illustratively passed through such openings and a complementarily threaded nut 68B is advanced onto the bolt 68A to secure the lower body portion 66A of the clip or tab 66 to the base portion 56B. One end of an upper body portion 66B is attached to or integral with one end of the lower body portion 66A, and the upper body portion 66B illustratively defines a slot 66C therethrough. A complementarily configured mounting key 66D is illustratively provided, and the slot 66C and key 66D may illustratively be used to mount a conventional restraint system anchor to the bracket assembly 46, e.g., in embodiments in which the restraint system 28 includes one or more anchors positioned at, on or adjacent to the side of the vehicle seat 12 opposite the side to which the buckle member 42 is mounted.

The sliding bracket assembly 70 illustratively includes a slidable bracket 72 defining an elongated, linear slot 72A therethrough. In the illustrated embodiment, the bracket 72 is a generally elongated and flat plate-type structure, and the elongated slot 72A defined therethrough illustratively terminates at opposing slot ends 72B and 72C. One end of the bracket 72 illustratively defines a pair of spaced-apart openings therethrough sized to receive a corresponding pair of fixation members 74A, 74B, e.g., screws, rivets or the like, and one end of a coupling member 76 defines a corresponding pair of openings therethrough also sized to receive the fixation members 74A, 74B. The bracket 72 is illustratively affixed to the coupling member 76 via the fixation members 74A, 74B.

The opposite end of the bracket 72 illustratively defines a slot 78 therethrough sized to receive therein one end of a flexible or semi-flexible tether, strap or web 82. The tether, strap or web 82 is illustratively affixed to the slidable bracket 72 by passing the one end of the tether, strap or web 82 through the slot 78 and affixing that end of the tether, strap or web 82 to itself in a conventional manner to couple the tether, strap or web 82 to the bracket 72. In one example embodiment, the tether, strap or web 82 is provided in the form of a conventional, flexible restraint web, e.g., woven nylon or other conventional material, although in some alternate embodiments the tether, strap or web 82 may be formed of one or more other materials and/or may be provided in the form of a semi-flexible material or materials. In any case, the opposite end of the tether, strap or web 82 is illustratively passed through a slot defined in an anchor bracket 186 and then affixed to itself in a conventional manner to couple the tether, strap or web 82 to the bracket 186. The anchor bracket 186 is illustratively mounted to a floor 16 of the motor vehicle to which the vehicle seat 12 is mounted, although in other embodiments the anchor bracket 186 may be attached or affixed or otherwise mounted to another support structure such as the seat base 14 or other support structure.

One end of the retractable cable 80 extends through an opening 84 defined through another anchor bracket 86 and is attached to an opposite end of the coupling member 76 in a conventional manner. The combination of the cable 80 and coupling member 76 extend laterally from the bracket 86 as illustrated in FIG. 2. The opposite end of the retractable cable 80 is affixed to the restraint system buckle member 42 (also see FIG. 1).

The sliding bracket assembly 70 is fixedly attached to the housing 44, e.g., via the restraint system anchor bracket 86, and is slidably mounted to the housing, e.g., via the slidable bracket 72. In the illustrated embodiment, for example, the restraint system anchor bracket 86 defines openings in opposite sides thereof which align with openings formed in each of the sides 44B and 44C of the housing 44. Conventional fixation members 96A and 96B, e.g., screws, rivets or the like, extend into such openings and engage the restraint system anchor bracket 86 to secure the bracket 86 to the housing 44. The top 44A of the housing 44 defines another opening 92 therethrough which aligns with the slot 72A defined through the bracket 72 when the sliding bracket assembly 70 is received within the channel 44E of the housing 44. A conventional fixation member 90A, e.g., a threaded bolt, is passed through the opening 92 and the slot 72A, and a complementarily threaded nut 90B is advanced onto the threads of the bolt 90A to maintain the shaft of the bolt 90A positioned within the slot 72A of the bracket 72. In some embodiments, e.g., as illustrated in FIG. 2, a collar 94 may be received on and over the shaft of the bolt 90A, and in such embodiments the collar 94 is sized to be received within and be slidable relative to the slot 72A. In other embodiments, the collar 94 may act as a spacer between the nut 90B and the bottom of the bracket 72, and in such embodiments the collar 94 is sized to be received on and over the shaft of the bolt 90A but not within the slot 72A of the bracket 72. In any case, the restraint system anchor bracket 86 of the sliding bracket assembly 70 is affixed to the housing 44 whereas the slidable bracket 72, and therefore also the retractable cable 80 attached thereto, is slidable along the slot 72A relative to the housing 44 generally and relative to the bolt 90A in particular.

The combination of the slidable bracket 72, the coupling member 76 and the retractable cable 80 is thus slidable relative to the housing 44 within the channel 44E in directions parallel with a longitudinal axis defined through the housing 44 and channel 44E. The fixation member 90A and the ends 72B, 72C of the slot 72A defined through the slidable bracket 72 illustratively cooperate to define two extreme positions of the bracket 72 between which the bracket 72 is slidable within the channel 44E of the housing 44 along the longitudinal axis thereof. As the retractable cable 80 is rigidly secured to the bracket 72, the two extreme positions of the bracket 72 likewise defined two extreme positions of the retractable cable 80 between which the cable 80 is retractable within, and extendable from, the housing 44. Illustratively, the end 72B of the slot 72A defines a fully extended position of the cable 80 relative to the housing 44, i.e., one extreme position of the slidable bracket 72 at which the cable 80 extends a maximum distance out of and away from the housing 44, and the end 72C of the slot 72A defines a fully retracted position of the cable 80, i.e., an opposite extreme position of the slidable bracket 72 at which the cable 80 extends a maximum distance into the housing 44. Illustratively, the extreme position of the bracket 72 defined by the end 72B of the slot 72A, i.e., in which the retractable cable 80 is in its fully extended position relative to the housing 44, is the "normal," pre-deployed operating position of the bracket assembly 70, i.e., the position of the bracket assembly 70 under normal, non-rollover or non-impending rollover and/or non-impact or non-impending impact vehicle operating conditions. As will be described in detail below, the bracket 72 is configured to move, relative to the housing 44, from its extreme position defined by the end 72B of the slot 72A to its extreme position defined by the end 7C of the slot 72A, i.e., in which the retractable cable 80 is in its fully retracted position relative to the housing 44, during rollover or impending rollover and/or vehicle impact or impending vehicle impact conditions. In any case, as the retractable cable 80 is moved from its "normal," fully extended position to its fully retracted position, the cable 80 acts on the restraint harness 30, i.e., via the buckle member 42, to "pre-tension" the restraint harness 30 by pulling and securing the restraint harness 30 more tightly about the occupant 26 of the vehicle seat 12.

The inflator piston assembly 100 illustratively includes an inflator tube 102, an inflator piston 120 and a web guide 126. In the illustrated embodiment, the inflator tube 102 is a hollow, cylindrical tube and the inflator piston 120 is a gas-filled cylinder sized to be received within the tube 102. Although the inflator tube 102 and the piston 120 are shown, and will be described, as being cylindrical structures, it will be understood that in alternate embodiments the tube 102 and/or the piston 120 may take on different geometrical shapes.

In the illustrated embodiment, an annular seal 106, e.g., a flexible O-ring or other conventional sealing mechanism, is received within a circumferential groove defined about a cylindrical plug 104, and the plug 104 is received within one end of the inflator tube 102. The plug 104, seal 106 and inflator tube 102 are sized such that the seal 106 forms an air-tight seal between the outer circumference of the plug 104 and the inner surface of the tube 102 when the plug 104 is received within the tube 102. Between the seal 106 and the opposite end of the plug 104, the plug 104 defines an opening 105 therethrough which aligns with another opening 114 defined through the inflator tube 102 when the plug 104 is received within the tube 102.

Another annular seal 118, e.g., a flexible O-ring or other conventional sealing mechanism, is received within a circumferential groove defined about an annular cap 116 that is affixed to the inflator piston 120 adjacent to one end 122 thereof. In one example embodiment, the annular cap 116 is threaded on an interior surface thereof, and the outer surface of the piston 120 is complementarily threaded adjacent to the end 122, and in such embodiments the cap 116 is affixed to the piston 120 by advancing it onto the threaded portion of the piston 120. In alternate embodiments, the annular cap 116 may be affixed to the piston 120 adjacent to the end 122 using one or more other conventional fixation techniques and/or structures. In any case, the end 122 of the piston 120, with the annular cap 116 affixed thereto, is slidably received within the opposite end of the inflator tube 102, i.e., opposite from the end that receives the plug 104. The annular cap 116, seal 118 and inflator tube 102 are sized such that the seal 118 forms an air-tight seal between the outer circumference of the annular cap 116, which is affixed to the inflator piston 120 at or near the end 122 thereof, and the inner surface of the tube 102 when the combination of the piston 120 and annular cap 118 is received within the tube 102. An air-tight space is thus defined within the inflator tube 102 between annular seals 106 and the 118, and the end 122 of the inflator piston 120 is in fluid communication with this air-tight space. The end 122 of the inflator piston 120 is or includes a nozzle or other orifice through which pressurized gas contained within the inflator piston 120 is expelled into the air-tight space defined within the inflator tube 102 when the inflator piston 120 is actuated as will be described in detail below.

The opposite end 124 of the inflator piston 120 is operatively coupled to an electronically controlled actuator 130, and a number, e.g., 2, of electrical wires 132 are electrically connected to the actuator 130. In one embodiment, the actuator 130 is a conventional pyrotechnic actuator or other incendiary-type actuator, although in some embodiments a non-pyrotechnic actuator may alternatively be used. In any case, the actuator 130 is responsive to one or more electrical signals received via the one or more electrical wires 132 to actuate the inflator piston 120 to release the pressurized gas contained therein via the nozzle or other orifice 122.

The web guide 126 illustratively defines an opening 128 therein sized to receive the end 124 of the inflator piston 120 with the actuator 130 mounted thereto. The web guide 126 illustratively resides on the end 124 of the piston 120 with the one or more wires 132 extending outwardly from the opening 128. The web guide 126 further illustratively defines an arcuate guide surface 148 opposite the opening 128. The arcuate guide surface 148 is defined between, and flanked by, opposing ridges or walls 149A, 149B each extending along a different side of the top, front and bottom surfaces of the web guide 126. The web guide 126 further defines a passageway opening 140 extending laterally therethrough, i.e., normal to the direction of the opening 128.

The inflator piston assembly 100 is illustratively fixedly attached to the housing 44 via the inflator tube 102, and is slidably mounted to the housing 44 via the web guide 126. In the illustrated embodiment, for example, the housing sides 44B, 44C each define an opening 112 therethrough which aligns with the opening 105 defined through the plug 104 and the opening 114 defined through the inflator tube 102. Fixation members 108A and 108B, illustratively provided in the form of a threaded bolt 108A and a complementarily threaded nut 108B, secure the inflation tube 102 to the housing 44 by passing the bolt 108A through the openings 112, 114, 105 from one side 44B of the housing 44 and advancing the nut 108B onto the bolt 108A from the opposite side 44C of the housing 44. In other embodiments, the bolt 108A may pass through the housing 44 from the opposite side 44C, and in still other embodiments one or more other conventional fixation members may be alternatively or additionally used to mount and affix the inflation tube 102 of the inflator assembly 100 to the housing 44. In one embodiment, a sleeve 110A is received on the bolt 108A, and a spacer 110B is received on the bolt 108A. The sleeve 110A and the spacer 110B illustratively operate to center or otherwise position the tube 102 within the housing 44 and between the sides 44B, 44C.

Figure 4A:
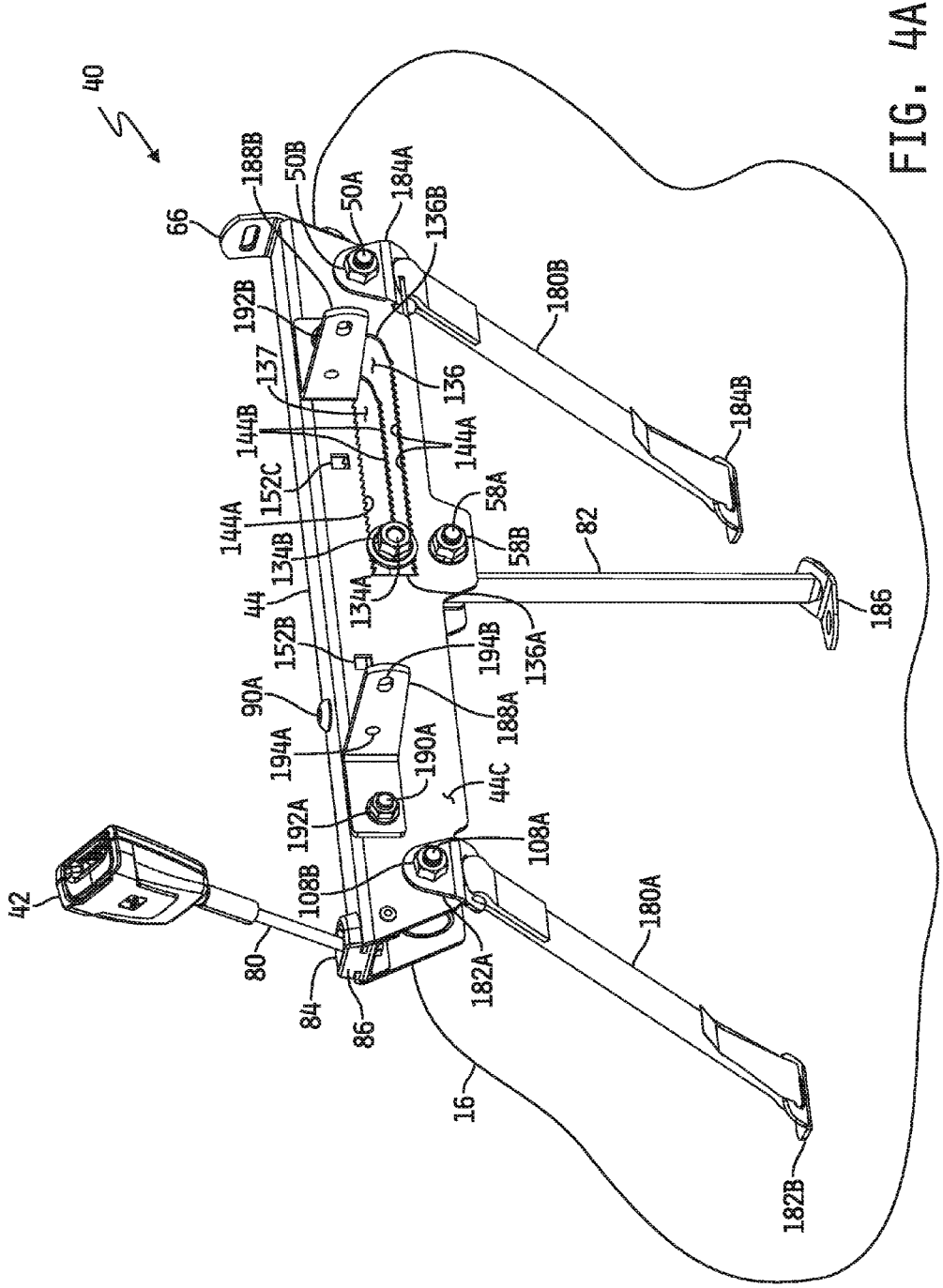
FIG. 4A is rear, seat-facing perspective view of the restraint web pre-tensioning and suspension seat pull-down device of FIGS. 1-2 illustrating an embodiment of a mounting arrangement for mounting the device to a vehicle seat.

In the illustrated embodiment, the housing sides 44B, 44C further each define an open, elongated channel 136, 137 respectively therethrough, and each channel 136, 137 illustratively defines a plurality of teeth or serrations 144A, 144B respectively along upper and lower edges thereof (see also FIG. 4A). The elongated channels 136, 137 each extend in a direction parallel with the longitudinal axis of the housing 44 and channel 44E defined therethrough, and the channels 136, 137 are illustratively aligned with each through the channel 44E defined through the housing 44. The channel 136 illustratively terminates at opposing ends 136A, 136B, and the channel 137 likewise terminates at opposing ends 137A, 137B aligned with the ends 136A, 136B respectively (only end 137B is illustrated in the attached figures). The channels 136, 137 also each illustratively align with the passageway 140 defined through the web guide 126, and a combination of two fixation members 134A and 134B, illustratively provided in the form of a threaded bolt 134A and a complementarily threaded nut 134B, a spacer sleeve 138 and a pair of guide members 142A, 142B cooperate with the passageway 140 to slidably mount the web guide 126 of the inflator piston assembly 100 to the sides 44B, 44C of the housing 44 via the channels 136, 137.

In the illustrated embodiment, the guide members 142A and 142B are each provided in the form of a split washer or plate defining an opening therethrough sized to receive the shaft of the fixation member 134A, and upper and lower spaced-apart legs 143A respectively extending away from the opening. The guide member 142A illustratively defines serrations or teeth 146A along the top surface of the upper leg 143A thereof and also along the bottom surface of the lower leg 143B thereof, and the serrations or teeth 146A are illustratively sized and configured to mesh or interdigitate with the serrations or teeth 144A defined along the top and bottom edges of the channel 136A (see, e.g., FIG. 4C). The guide member 142B likewise defines serrations or teeth 146B along the top surface of the upper leg 143A thereof and also along the bottom surface of the lower leg thereof, and the serrations or teeth 146B are illustratively sized and configured to mesh or interdigitate with the serrations or teeth 144B defined along the top and bottom edges of the channel 136B. The spacer sleeve 138 is illustratively sized to receive the shaft of the fixation member 134A therein and to be received through the passageway 140.

In one embodiment, the combination of the fixation members 134A and 134B, spacer sleeve 138 and guide members 142A, 142B may slidably mount the web guide 126 of the inflator piston assembly 100 to the housing 44 via the channels 136, 137 respectively defined through the sides 44B, 44C of the housing 44 as follows. The fixation member 134A may be passed through the guide member 142B and then through the spacer sleeve 138, and the combination of the fixation member 134A, guide member 142B and spacer sleeve 138 may then be passed through the channel 137 defined through the sidewall 44B of the housing and through the passageway 140 defined through the web guide 126. The guide member 142B may then be engaged with the channel 137 by interdigitating the serrations or teeth 146B defined along the top surface of the upper leg 143A and also along the bottom surface of the lower leg 143B of the guide member 142B with the serrations or teeth 144B defined along the top and bottom edges of the channel 1367. The end of the fixation member 134A extending through the passageway 140 may then be passed through the guide member 142A, and the guide member 142A may be engaged with the channel 136 by interdigitating the serrations or teeth 146A defined along the top surface of the upper leg 143A and also along the bottom surface of the lower leg thereof 143B of the guide member 142A with the serrations or teeth 144A defined along the top and bottom edges of the channel 136 (see, e.g., FIG. 4C). The fixation member 134B may then be secured to the end of the fixation member 134A extending away from the guide member 142A to secure the combination of the guide members 142A, 142B and the web guide 126 to the housing 44. Illustratively, the length of the spacer sleeve 138 is selected to maintain the web guides 142A, 142B aligned and engaged with the channels 136, 137 respectively.

The serrations or teeth 144A, 144B, 146A, 146B are illustratively oriented, e.g., angled, such that the serrations or teeth 146A, 146B may advance along and relative to the serrations or teeth 144A, 144B, e.g., with conventional ratcheted movement, in one direction but be blocked or prohibited by the serrations or teeth 144A, 144B from moving in the opposite direction. In the illustrated embodiment, the serrations or teeth 144A, 144B, 146A, 146B are so configured to allow linear advancement or linear ratcheting of the web guide 126 along the channels 136, 137 only in a direction away from the inflation tube 102 from one end 136A, 137A of the channels 136, 137 toward the opposite end 136B, 137B of the channels 136, 137. In the opposite direction, i.e., in a direction toward the inflation tube 102 from the one end 1368, 137B of the channels 136, 137 toward the opposite end 136A, 137A of the channels 136, 137, the orientations of the interdigitated serrations or teeth 144A, 144B, 146A, 146B illustratively block or prohibit linear movement of the web guide 126.

When the restraint web pre-tensioning and/or suspension seat pull-down device 40 is assembled, a portion of the tether, strap or web 82 between the slidable bracket 72 and the anchor bracket 186 is received between the walls 149A, 149B and in contact with the arcuate guide surface 148 of the web guide 126. When the inflator piston 120 moves the web guide 126 along the channels 136, 137 (i.e., in the direction from the ends 136A, 137A of the channels 136, 137 toward the ends 1368, 137B of the channels 136, 137 respectively) in response to actuation of the actuator 130, the guide surface 148 of the web guide 126 acting on the tether, web or strap 82 initially causes the cable 80 to retract into the housing 40, thereby pre-tensioning the restraint harness 30 about the occupant 26 of the vehicle seat 12, and then when the cable 80 is fully retracted within the housing, to further cause the seat frame 14, and thus the entire seat portion 25, to be drawn downwardly to the seat base 14. Assembled views of the restraint web pre-tensioning and/or suspension seat pull-down device 40 are illustrated in FIGS. 5A-7C, and a complete description of the operation of the device 40, including cooperation and interaction between the various components illustrated in FIG. 2, will be described in detail below with reference to FIGS. 5A-7C.

Figure 3:
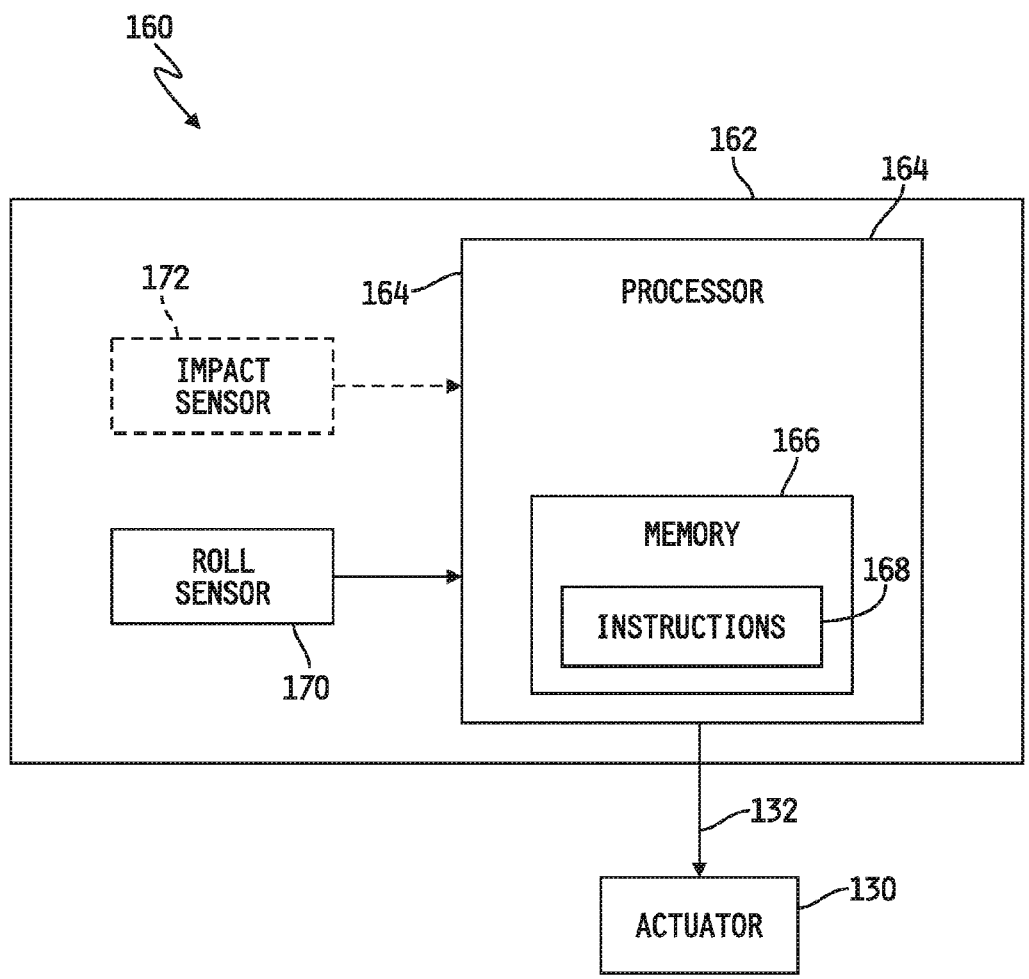
FIG. 3 is a simplified diagram of an embodiment of a vehicle rollover and/or impact detection system electrically connected to the actuator of the restraint web pre-tensioning and suspension seat pull-down device illustrated in FIG. 2.

Referring now to FIG. 3, a simplified diagram is shown of an embodiment of a vehicle rollover and/or impact detection system 160 electrically connected to the actuator 130 of the restraint web pre-tensioning and suspension seat pull-down device 40 illustrated in FIG. 2. In the illustrated embodiment, the vehicle rollover and/or impact detection system 160 includes a housing 162 in or to which a conventional processor 164, and conventional roll sensor 170 are mounted. In one alternate embodiment, as illustrated by dashed-line representation in FIG. 3, the system 160 may further include a convention impact sensor 172 mounted to or within the housing 162. In another alternate embodiment, the roll sensor 170 may be omitted from the system 160 such that only the processor 164 and the impact sensor 172 are mounted to or within the housing 162. In any case, the housing 162 is illustratively mounted to a support surface that is rigidly coupled to the motor vehicle in which the vehicle seat 12 is mounted. In one embodiment, for example, the housing 162 is mounted to the floor 16 of the motor vehicle. In some alternate embodiments, the housing 162 may be mounted to the seat base 14 which is itself rigidly secured to the floor 16 of the motor vehicle. Those skilled in the art will recognize other support structures within the motor vehicle to which the housing 162 may be mounted, and it will be understood that all such other support structures are intended to fall within the scope of this disclosure.

In embodiments that include the roll sensor 170, the sensor 170 includes at least one signal output electrically connected to at least one corresponding signal input of the processor 164, and the sensor 170 is operable in a conventional manner to produce a roll signal at the at least one signal output thereof. In one embodiment, the roll sensor 170 is or includes a conventional sensor in which the roll signal produced by thereby corresponds to an angular position of the motor vehicle in which the sensor 170 is mounted relative to a reference angle. Illustratively, the reference angle is the angle of the motor vehicle, relative to a plane or axis that longitudinally bisects the motor vehicle, when the motor vehicle is at rest and supported by its plurality of wheels on a level surface. In an alternate embodiment, the roll sensor 170 is or includes a conventional sensor in which the roll signal produced thereby corresponds to an angular velocity, e.g., a rate of change of the angular position of the motor vehicle. In another alternate embodiment, the roll sensor 170 is or includes a conventional inertia sensor, e.g., an accelerometer, in which the roll signal produced thereby corresponds to rotational inertia about the longitudinal plane or axis, from which angular position and/or velocity may be determined. In still another alternate embodiment, the roll sensor 170 may be or include any combination of the foregoing roll sensor types. Those skilled in the art will recognize other sensors that may be used in place of, or in addition to, one or more of the foregoing sensors, from which the angular position and/or velocity of the motor vehicle can be determined, and it will be understood that any and all such other sensors are intended to fall within the scope of this disclosure.

In embodiments that include the impact sensor 172, the sensor 172 includes at least one signal output electrically connected to at least one corresponding signal input of the processor 164, and the sensor 172 is operable in a conventional manner to produce an impact signal at the at least one signal output thereof. In one embodiment, the impact sensor 172 is or includes a conventional sensor, e.g., in the form of one or more accelerometers, in which the impact signal produced by thereby corresponds to a vehicle inertial, velocity and/or acceleration signal indicative of the inertia, velocity and/or acceleration of the motor vehicle in which the sensor 172 is mounted. Those skilled in the art will recognize other sensors that may be used in place of, or in addition to, one or more of the foregoing impact sensors, and it will be understood that any and all such other sensors are intended to fall within the scope of this disclosure.

The processor 164 further includes at least one signal output electrically connected to the at least one signal input of the inflator piston actuator 130 via the one or more electrical wires 132. In the illustrated embodiment, the processor 164 includes a conventional memory unit 166. In some alternate embodiments, the memory unit 166 may be separate from the processor 164 and electrically connected thereto in a conventional manner. In other alternate embodiments, the processor 164 may include at least a portion of the memory unit 166, and at least another portion of the memory unit 166 may be external to, and electrically connected to, the processor 164. In any case, the memory unit 166 illustratively has one or more sets of instructions 168 stored therein which, when executed by the processor 164, cause the processor 164 to produce an actuator control signal for controlling operation of the inflator piston actuator 130, and to provide the actuator control signal to the inflator piston actuator 130 via the one or more electrical wires 132. In embodiments which include the roll sensor 170, the instructions 168 stored in the memory 166 include instructions which, when executed by the processor 164, cause the processor to process the roll signal produced by the roll sensor 170 to determine the angular position, velocity and/or inertia of the vehicle in which the roll sensor 170 is mounted, to control the actuator control signal to an actuator activation state which actuates the actuator 130 when the angular position, velocity and/or inertia of the vehicle indicates that a vehicle roll event is imminent and to otherwise control the actuator control signal to an actuator deactivation state. In embodiments which include the impact sensor 172, the instructions 168 stored in the memory 166 include instructions which, when executed by the processor 164, cause the processor to process the impact signal produced by the impact sensor 172 to determine the inertia, speed and/or acceleration of the vehicle in which the impact sensor 172 is mounted, to control the actuator control signal to an actuator activation state which actuates the actuator 130 when the inertia, speed and/or acceleration of the vehicle indicates that a vehicle impact event is imminent and to otherwise control the actuator control signal to an actuator deactivation state. Those skilled in the art will recognize that control of the inflator piston actuator 130, as just described, may be implemented in whole or in part in the form of hardware components, e.g., electrical circuit components, in the form of firmware components and/or in the form of software executable by the processor 16, and it will be understood that any such control implementation is intended to fall within the scope of this disclosure.

Referring again to FIG. 2, the housing 44 further illustratively defines a number of openings therethrough, e.g., through the side wall 44C, to facilitate mounting of the restraint web pre-tensioning and/or suspension seat pull-down device 40 to the seat frame 18 and/or to other suitable structure of the vehicle seat 12. In the illustrated embodiment, for example, four such openings 152A, 152B, 152C and 152D are provided to accommodate multiple different mounting arrangements, some examples of which are illustrated in FIGS. 4A-4D. Referring now to FIG. 4A, an embodiment of one such mounting arrangement for mounting the device 40 to the vehicle seat 12 is shown. In the illustrated embodiment, an L-shaped bracket 188A is mounted to the opening 152A via a pair of fixation members 190A, 192A, e.g., a threaded bolt and nut combination, and another L-shaped bracket 188B is mounted to the opening 152D via another pair of fixation members 192A, 192B (only the fixation member 192B is shown in FIG. 4A), e.g., a threaded bolt and nut combination. In the embodiment illustrated in FIG. 4A, the L-brackets 188A, 188B are oriented relative to the housing 44 so as to minimize the distance between the bracket portions extending away from the side wall 44C of the housing 44. Alternatively, the brackets 188A, 188B, oriented as illustrated in FIG. 4A, may be mounted to the openings 152B and 152C respectively. In any case, each bracket 188A, 188B illustratively defines a pair of horizontally spaced-apart openings 194A, 194B centrally through the bracket portions extending away from the side wall 44C of the housing, and such openings 194A, 194B are illustratively sized to receive corresponding fixation members therein for affixing the brackets 188A, 188B to a correspondingly configured embodiment of the seat frame 18, or other suitable structure, of the vehicle seat 12.

Figure 4B:
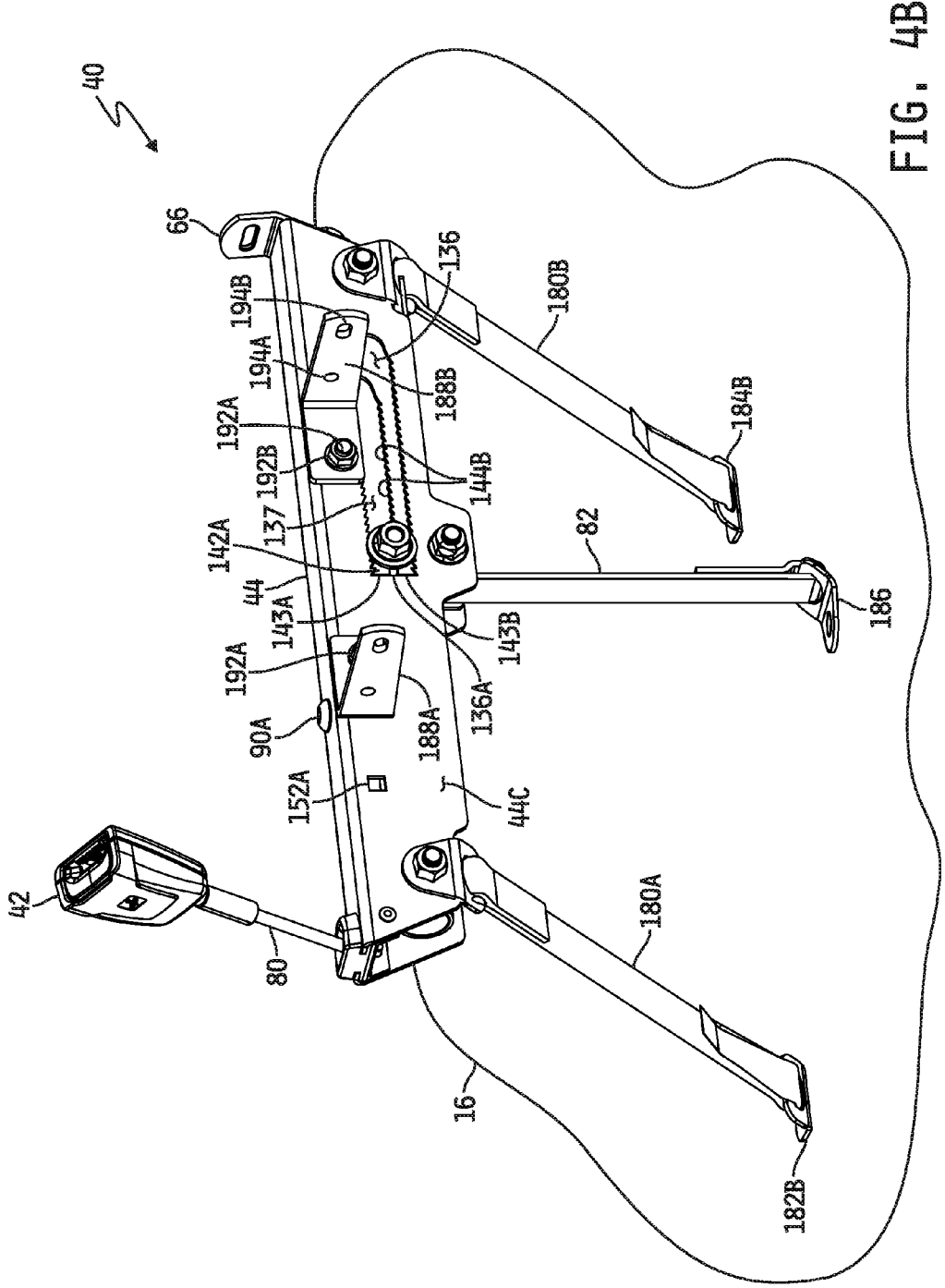
FIG. 4B is rear, seat-facing perspective view of the restraint web pre-tensioning and suspension seat pull-down device of FIGS. 1-2 illustrating another embodiment of a mounting arrangement for mounting the device to a vehicle seat.

Referring now to FIG. 4B, an embodiment is shown of another mounting arrangement for mounting the device 40 to the vehicle seat 12. In the illustrated embodiment, the L-shaped brackets 188A, 188B illustrated and described with respect to FIG. 4A are mounted to the openings 152B and 152C of the housing 44, and the brackets 188A, 188B are illustratively oriented relative to the housing 44 so as to maximize the distance between the bracket portions extending away from the side wall 44C. The mounting arrangement illustrated in FIG. 4B is otherwise identical to that described with respect to FIG. 4A. Alternatively, the brackets 188A, 188B, oriented as illustrated in FIG. 4B, may be mounted to the openings 152A and 152D respectively. In either case, the openings 194A, 194B are illustratively sized to receive corresponding fixation members therein for affixing the brackets 188A, 188B to a correspondingly configured embodiment of the seat frame 18, or other suitable structure, of the vehicle seat 12.

Figure 4C:
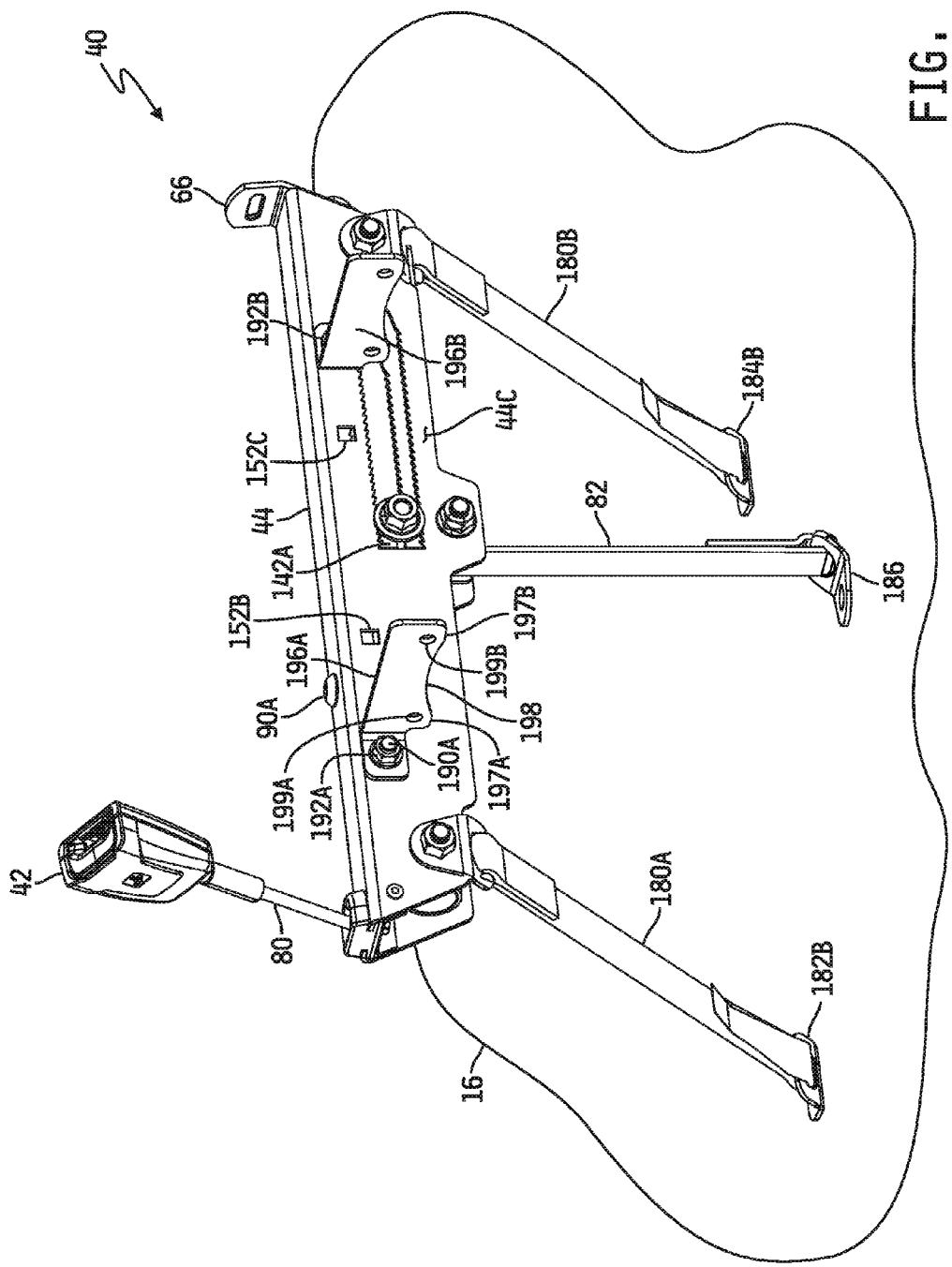
FIG. 4C is rear, seat-facing perspective view of the restraint web pre-tensioning and suspension seat pull-down device of FIGS. 1-2 illustrating yet another embodiment of a mounting arrangement for mounting the device to a vehicle seat.

Referring now to FIG. 4C, an embodiment is shown of yet another mounting arrangement for mounting the device 40 to the vehicle seat 12. In the illustrated embodiment, an L-shaped bracket 196A is mounted to the opening 152A via the pair of fixation members 190A, 192A, e.g., a threaded bolt and nut combination, and another L-shaped bracket 196B is mounted to the opening 152D via the pair of fixation members 192A, 192B (only the fixation member 192B is shown in FIG. 4C), e.g., a threaded bolt and nut combination. In the embodiment illustrated in FIG. 4C, the L-brackets 196A, 196B are oriented relative to the housing 44 so as to minimize the distance between the bracket portions 198 extending away from the side wall 44C of the housing 44. In one alternative embodiment, the brackets 196A, 196B, oriented as illustrated in FIG. 4A, may be mounted to the openings 152B and 152C respectively. In another alternative embodiment, the brackets 196A, 1988 may be oriented relative to the housing 44 so as to maximize the distance between the bracket portions 198 thereof, and mounted to the openings 152A, 152D respectively or to the openings 152B, 152C respectively. In any case, each bracket 196A, 196B illustratively defines a pair of horizontally spaced-apart lobes 197A, 197B each extending downwardly away from the bottom edge of the bracket portion 198 adjacent to an opposite end of the bracket portion 198, and further defines an opening 199A, 199B centrally through each lobe 197A, 197B respectively. Such openings 199A, 199B are illustratively sized to receive corresponding fixation members therein for affixing the brackets 196A, 196B to a correspondingly configured embodiment of the seat frame 18, or other suitable structure, of the vehicle seat 12.

Figure 4D:
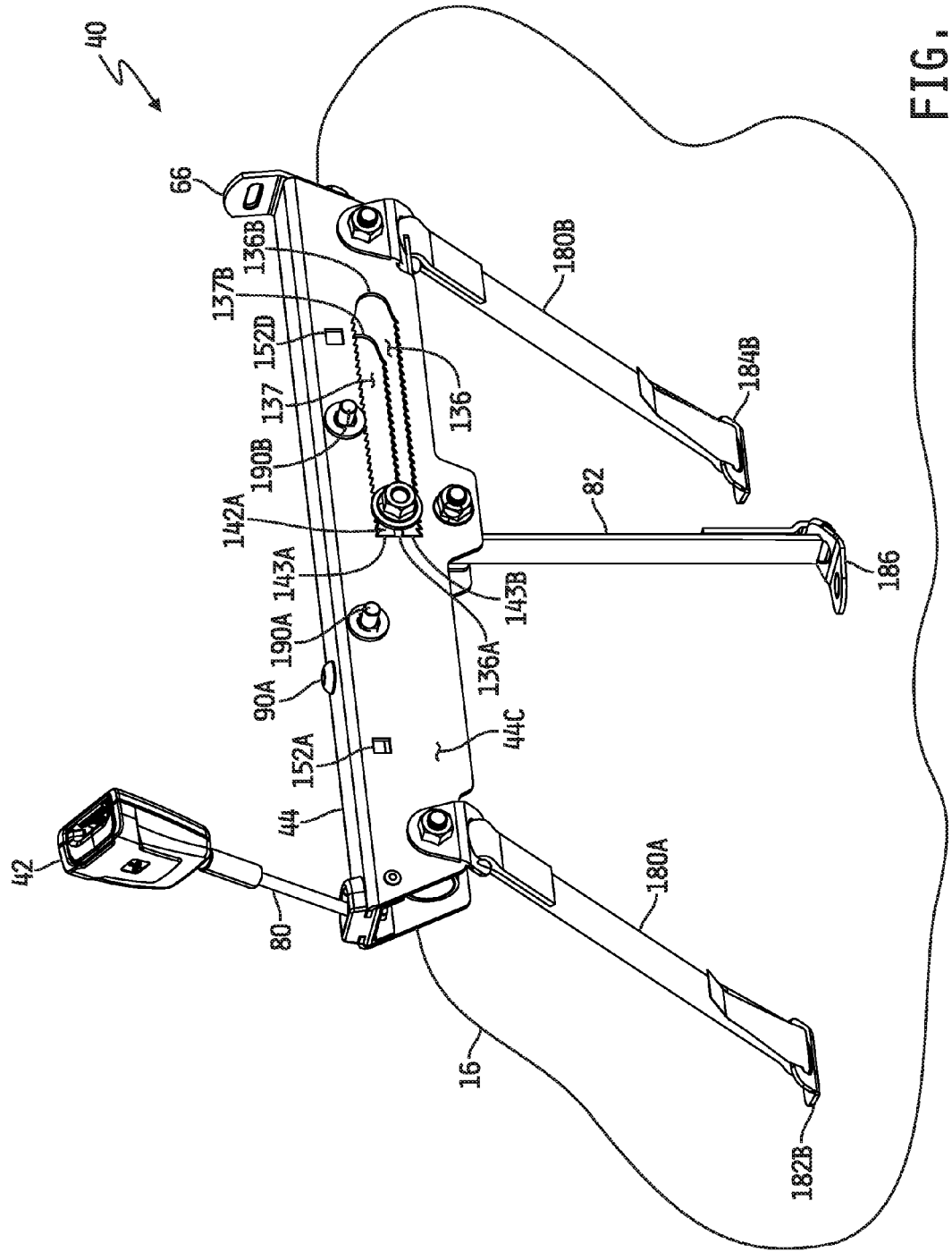
FIG. 4D is rear, seat-facing perspective view of the restraint web pre-tensioning and suspension seat pull-down device of FIGS. 1-2 illustrating a further embodiment of a mounting arrangement for mounting the device to a vehicle seat.

Referring now to FIG. 4D, an embodiment is shown of a further mounting arrangement for mounting the device 40 to the vehicle seat 12. In the illustrated embodiment, the fixation members 190A, 1908 are extended through the openings 152B, 152C respectively. In alternative embodiments, the fixation members 190A, 1908 may be extended through the openings 152A, 152D respectively. In any case, the fixation members 190A, 1908 are illustratively sized to affix the housing 44 directly to a correspondingly configured embodiment of the seat frame 18, or other suitable structure of the vehicle seat 12.

In the embodiments illustrated in FIGS. 4A-4D, the anchor bracket 186 is shown secured to the floor 16 of the motor vehicle in which the vehicle seat 12 is mounted, such that the housing 44 of the restraint web pre-tensioning and/or suspension seat pull-down device 40 is centrally tethered by the tether, web or strap 82 directly to the floor 16 via the bracket 186. Also shown in the illustrated embodiments are two additional tethers, webs or straps 180A, 180B to tether opposing ends of the housing 44 to the floor 16. In the illustrated embodiments, for example, an anchor bracket 182A is attached to the housing 44 near one end thereof, e.g., to the side wall 44C via the fixation members 108A, 108B, and one end of the tether, web or strap 180A is passed through a slot defined in the anchor bracket 182A and then affixed to itself in a conventional manner to couple the tether, strap or web 180A to the bracket 182A. The opposite end of the tether, strap or web 180A is illustratively passed through a slot defined in another anchor bracket 182B and then affixed to itself in a conventional manner to couple the tether, strap or web 180A to the bracket 182B. The anchor bracket 182B is illustratively mounted to the floor 16 of the motor vehicle to which the vehicle seat 12 is mounted, although in other embodiments the anchor bracket 182B may be attached or affixed or otherwise mounted to another support structure such as the seat base 14 or other support structure.

Another anchor bracket 184A is attached to the housing 44 near an opposite end thereof, e.g., to the side wall 44C via the fixation members 50A, 50B, and one end of the tether, web or strap 180B is passed through a slot defined in the anchor bracket 184A and then affixed to itself in a conventional manner to couple the tether, strap or web 180B to the bracket 184A. The opposite end of the tether, strap or web 180B is illustratively passed through a slot defined in yet another anchor bracket 184B and then affixed to itself in a conventional manner to couple the tether, strap or web 180B to the bracket 184B. The anchor bracket 184B is illustratively mounted to the floor 16 of the motor vehicle to which the vehicle seat 12 is mounted, although in other embodiments the anchor bracket 184B may be attached or affixed or otherwise mounted to another support structure such as the seat base 14 or other support structure. In one example embodiment, the tethers, straps or webs 180A, 180B are provided in the form of conventional, flexible restraint webs, e.g., woven nylon or other conventional material, although in some alternate embodiments either or both of the tethers, straps or webs 180A, 180B may be formed of one or more other materials and/or may be provided in the form of other semi-flexible material or materials.

In embodiments which include the tethers, webs or straps 180A, 180B, such tethers, webs or straps illustratively act to stabilize the position of the housing 44 relative to the seat frame 18 to which the housing 44 is mounted, e.g., to maintain a plane defined by the top 44A of the housing 44 substantially parallel with a horizontal plane defined by the top surface of the seat frame 18 to which the seat cushion 22 is mounted. In some alternate embodiments, either or both of the tethers, webs or straps 180A, 180B, and associated mounting hardware, may be omitted. In any case, the tether, web or strap 82, and the tethers, webs or straps 180A, 180B in embodiments which include them, are illustratively sized to be taught when the seat frame 18 of the suspension seat 12 is at its highest vertical position relative to the seat base 14, i.e., when the vertical displacement between the seat frame 18 and the seat base 14 is at its maximum, to thereby avoid interfering with the full range of motion of the seat portion 25 of the suspension seat 12. Lower positions of the seat frame 18 relative to the seat base 14 illustratively introduces slack into the tethers, webs or straps 82, 180A, 180B.

Figure 5A:
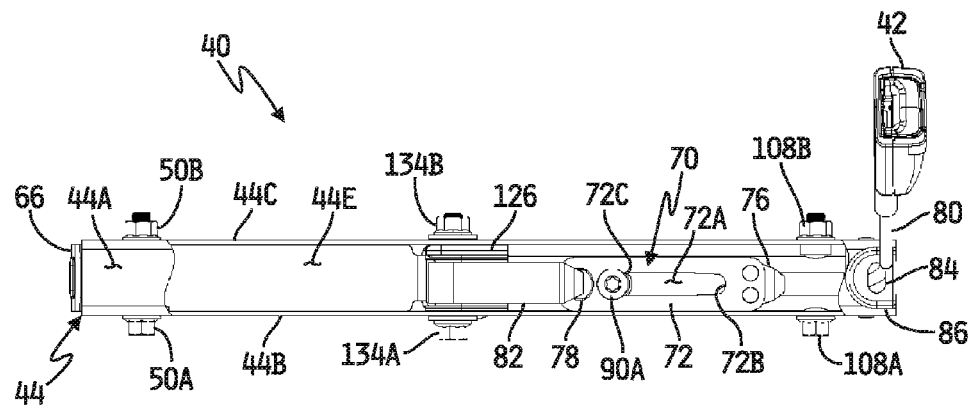
FIGS. 5A and 5B are top plan with partial cutaway and front elevational with partial cutaway views respectively of the restraint web pre-tensioning and suspension seat pull-down device of FIGS. 1-2 illustrating some of the components thereof prior to activation of the device actuator.
Figure 5B:
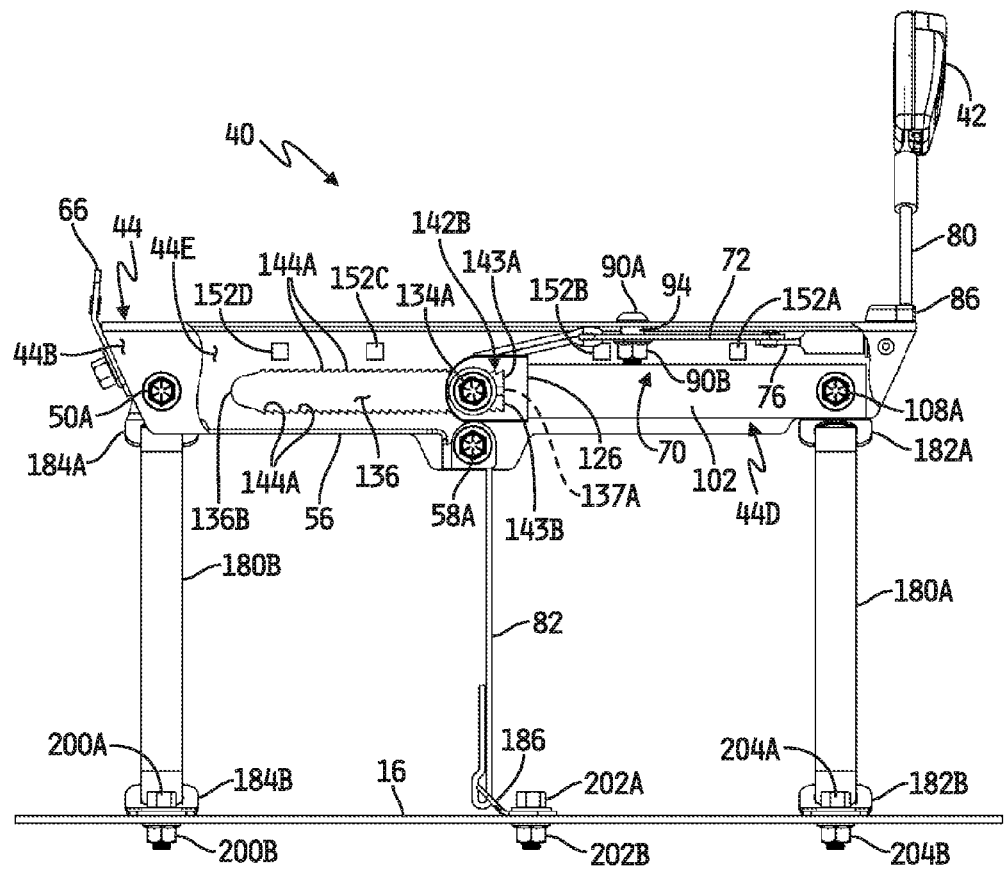

With reference to FIGS. 5A-7C, operation of the restraint web pre-tensioning and suspension seat pull-down device 40 will be described in detail. Referring now to FIGS. 5A and 5B, a top plan, partial cutaway view and a front elevational, partial cutaway view (i.e., as viewed from behind and toward the rear of the vehicle seat 12), respectively, are shown of the restraint web pre-tensioning and suspension seat pull-down device 40 is it's "normal," pre-deployed state, i.e., under non-rollover or non-impending rollover and/or non-impact or non-impending impact vehicle operating conditions, such that the suspension seat 12 extends upwardly away from the seat base 12 as illustrated in FIG. 1. In the pre-deployed state, the inflator piston 120 is unactuated and is fully received within the inflator tube 102 with the one end 122 of the piston 120 proximate to the plug 104 and with the opposite end 124 proximate to the open end of the tube 102 such that the web guide 126 is adjacent to, and extends away from, the open end of the tube 102. With the web guide 126 in this pre-deployed position, the tether, web or strap 82 extends between the slidable bracket 72 and the anchor bracket 186, and between the slidable bracket 72 and the anchor bracket 186 the tether, web or strap 82 is loop about the arcuate guide surface 148 of the web guide 126 and the curved surface of the cylindrical sleeve 62 received on the fixation member 58A. In the pre-deployed state, the fixation member (hereinafter "stop member") 90A is in contact with the end 72C of the slot 72A, and as illustrated in FIG. 5B the length of the tether, web or strap 82 is illustratively selected (as are the lengths of the webs 180A, 180B in embodiments which include such webs) such that it is taught, or somewhat taught, only at or near the maximum spacing between the seat frame 18 and the seat base 14 so that the stop member 90A is maintained in the pre-deployed state at or near the end 72C of the slot 72A. As also illustrated in FIG. 5B and in FIGS. 4A-4D, the web guide 126 is positioned relative to the channels 136, 137 such that the planar ends of the legs 143A, 143B of the guide members 142A, 142B are at or near the ends 136A, 137A of the channels 136, 137 respectively (channel end 137A shown in phantom in FIG. 5B due to the cutaway illustration). Thus, in the pre-deployed state of the restraint web pre-tensioning and suspension seat pull-down device 40 illustrated in FIGS. 5A and 5B, the stop member 90A is at or near the end 72C of the slot 72A defined through the slidable bracket 72, the planar ends of the legs 143A, 143B of the guide members 142A, 142B are at or near the ends 136A, 137A of the channels 136, 137 defined through the side walls 44C and 44B respectively of the housing 44, and the cable 80 is in its fully extended position relative to the housing 44.

Figure 6A:
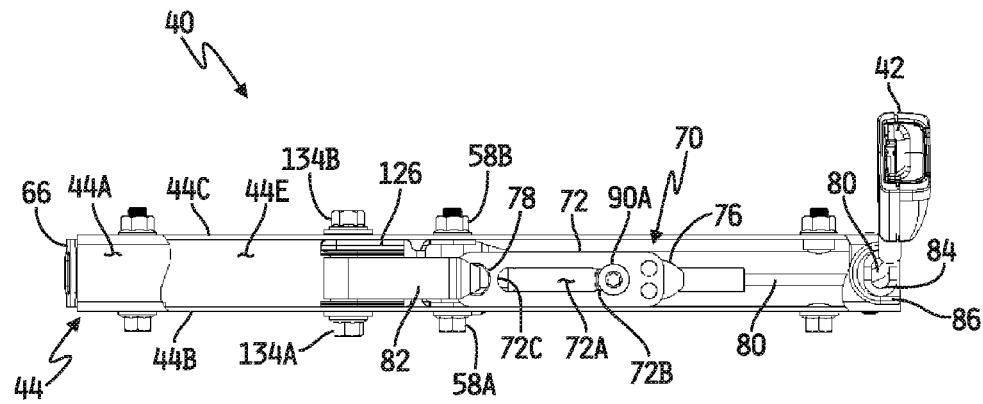
FIGS. 6A and 6B are top plan with partial cutaway and front elevational with partial cutaway views respectively of the restraint web pre-tensioning and suspension seat pull-down device of FIGS. 1-2 illustrating some of the components thereof prior following activation of the device actuator with the restraint web anchorage fully retracted.
Figure 6B:
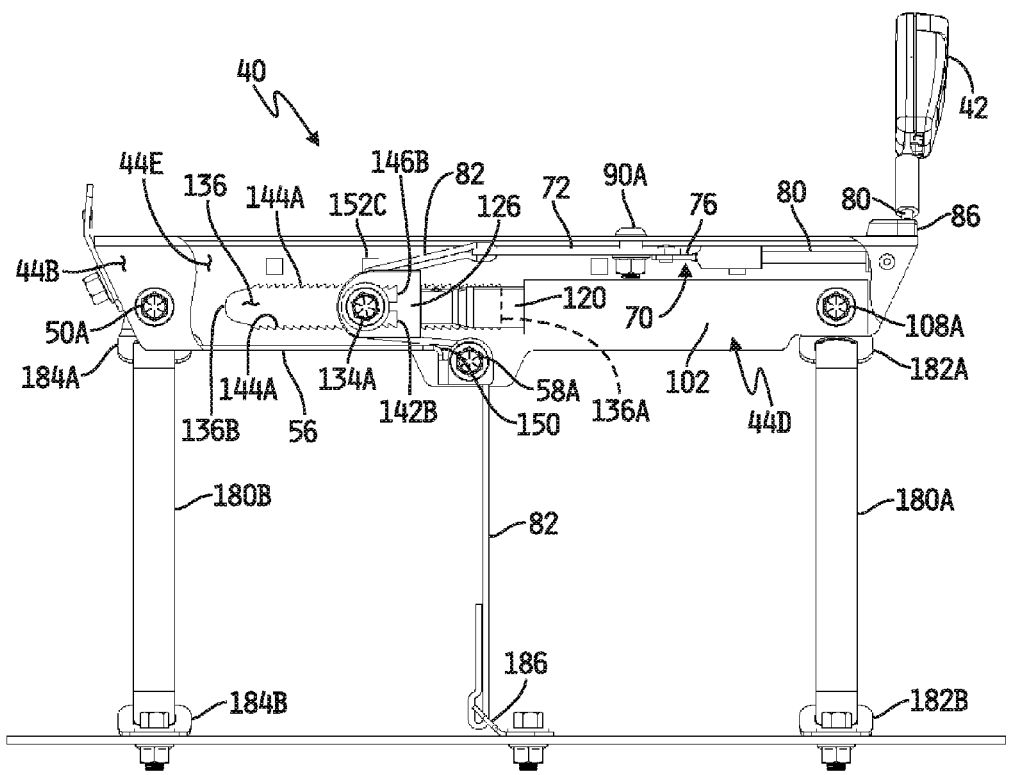

Referring now to FIGS. 6A and 6B, a top plan, partial cutaway view and a front elevational, partial cutaway view (i.e., as viewed from behind and toward the rear of the vehicle seat 12), respectively, are shown of the state of the restraint web pre-tensioning and suspension seat pull-down device 40 at the end of its web pre-tensioning phase or operation, i.e., under potential or impending rollover and/or potential or impending impact vehicle operating conditions. In the illustrated embodiment, the actuator 130 is activated, e.g., via control by the vehicle rollover and/or impact detection system 160 illustrated in FIG. 3 of the actuator control signal to an activated state in response to a signal produced by the roll sensor 170 and/or impact sensor 172 as described above, at the beginning of the web pre-tensioning phase. The activated actuator 130, in turn, actuates the inflator piston 120 to release the pressurized gas contained therein via the nozzle or orifice 122. The pressurized gas released from the nozzle or orifice 122 fills the space within the inflator tube 102 between the plug 104 and the annular cap 116 affixed to the inflator piston 120 and, as the gas pressure within the space increases the inflator piston 120 is forced away from the plug 104, thereby causing the web guide 126 to move along the channels 136, 137 of the housing 44 away from the ends 136A, 137A thereof. As the inflator piston 120 moves the web guide 126 along the channels 136, 137 following actuation of the actuator 130, the web guide 126 acting on the tether, web or strap 82 displaces non-stationary end of the tether, web or strap 82 coupled to the slidable bracket 72, thereby moving the bracket 72 in the same direction as that of the moving piston 120, i.e., away from the anchor bracket 86, and drawing the retractable cable 80 into the housing 40.

Retraction of the cable 80 into the housing 40, in turn, draws the buckle member 42 toward the anchor bracket 86, thereby pre-tensioning the restraint harness 30, i.e., drawing the restraint harness 30 more tightly about the occupant 26. As the moving web guide 126 forces the slidable bracket 72 away from the anchor bracket 86, the slot 72A moves relative to the stationary stop member 90A such that the end 72C of the slot 72A moves away from the stop member 90A and the end 72B of the slot 72A moves toward the stop member 90A. The end of the web pre-tensioning phase or operation is reached when the end 72B of the slot 72A moves into contact with the stop member 90A, at which point the retractable cable 80 is in its fully retracted position within and relative to the housing 44. Contact by the stop member 90A with the end 72B of the slot 72A illustratively fixes the position of the end of the tether, strap or web 82 coupled to the slidable bracket 72 relative to the housing 44 and, because the housing 44 is rigidly secured to the seat frame 18, accordingly fixes the position of the end of the tether, web or strap 72 coupled to the slidable bracket 72 relative to the seat frame 18. Thus, in the pre-tensioning phase of the restraint web pre-tensioning and suspension seat pull-down device 40, movement of the inflator piston 120 relative to the fixed inflator tube 102 forces the retractable cable 80 from its pre-deployed or fully extended position illustrated in FIGS. 5A and 5B to its pre-tensioned or fully retracted position illustrated in FIGS. 6A and 6B, and such retraction of the cable 80 into the housing 44 of the device 40, in turn, draws the buckle member 42 toward the anchor bracket 86, thereby pre-tensioning the restraint harness 30, i.e., drawing the restraint harness 30 more tightly about the occupant 26. At the end of the pre-tensioning phase, the end of the tether, web or strap 72 that is coupled to the slidable bracket 72 is effectively fixed to the seat frame 18 of the vehicle seat 12.

Figure 7A:
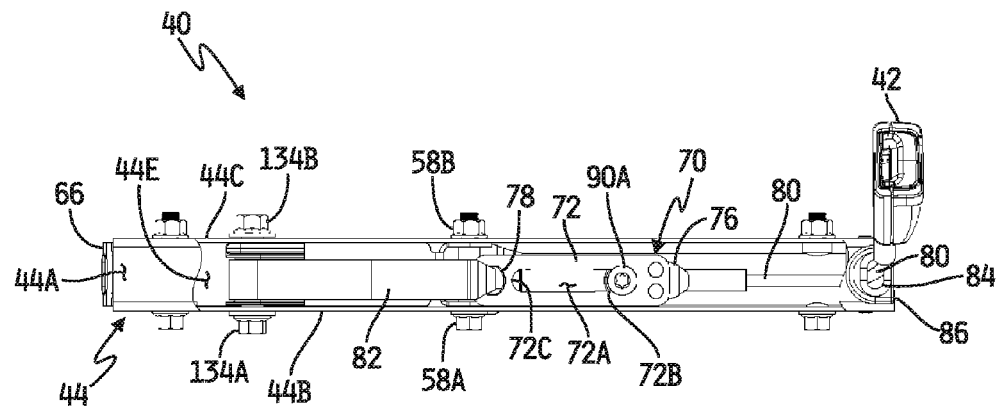
FIGS. 7A and 7B are top plan with partial cutaway and front elevational with partial cutaway views respectively of the restraint web pre-tensioning and suspension seat pull-down device of FIGS. 1-2 illustrating some of the components thereof following activation of the device actuator with the seat portion of the suspension seat pulled by the device to the seat based of the suspension seat.
Figure 7B:
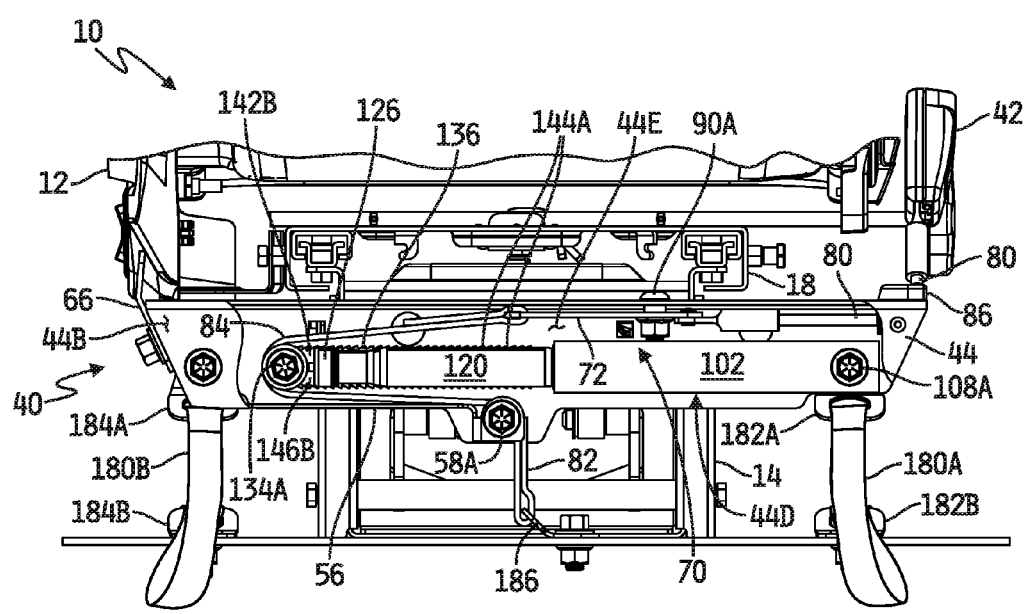
Figure 7C:
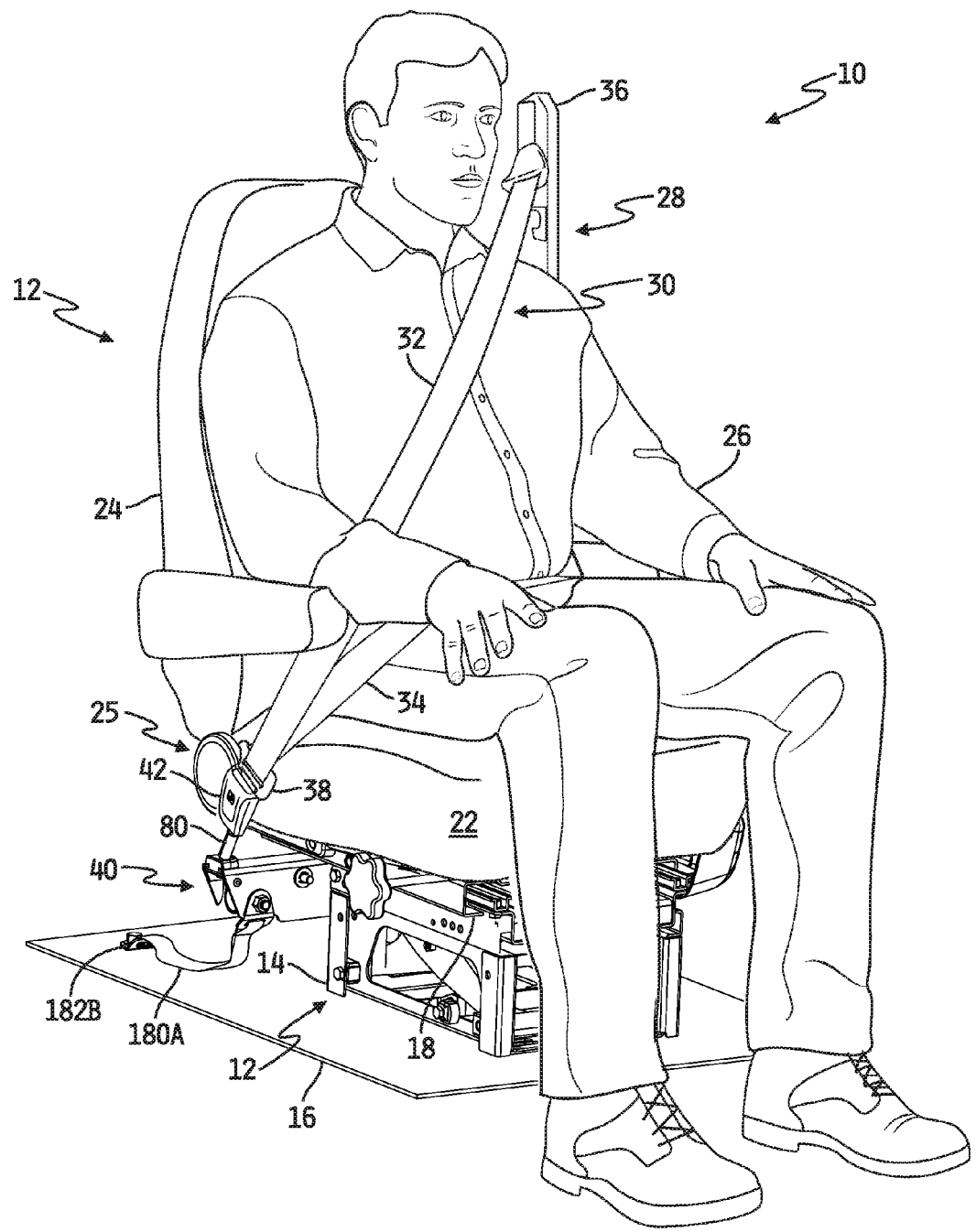
FIG. 7C is a front perspective view of the suspension seat with the seat portion of the suspension seat pulled by the restraint web pre-tensioning and suspension seat pull-down device to the seat base of the suspension seat.

Referring now to FIGS. 7A-7C. a top plan, partial cutaway view and a front elevational, partial cutaway view (i.e., as viewed from behind and toward the rear of the vehicle seat 12), respectively, are shown of the state of the restraint web pre-tensioning and suspension seat pull-down device 40 at the end of its seat pull-down phase or operation, i.e., under rollover or impending rollover and/or impending vehicle impact or vehicle impact operating conditions. It will be understood that the seat pull-down phase or operation of the device 40 is illustratively applicable in embodiments in which the vehicle seat 12 is a suspension seat, e.g., as illustrated in FIG. 1. In embodiments in which the vehicle seat 12 is not a suspension seat and in which the vertical spacing between the seat portion 25 of the vehicle seat 12 and the seat base 14, if any, is instead substantially fixed, the seat pull-down phase or operation of the device 40 is inapplicable and the device 40 may, in such embodiments, be modified, e.g., via modification of the length of travel of the inflator piston 120 relative to the inflator tube 102, to omit the seat pull-down phase or operation of the device 40. For purposes of this description, however, the seat pull-down phase or operation of the device 40 will be described in relation to the suspension seat 12 illustrated in FIG. 1.

Prior to the state of the restraint web pre-tensioning and suspension seat pull-down device 40 illustrated in FIGS. 7A-7C, movement of the web guide 126 by the action of the inflator piston 120 during the web pre-tensioning phase just described has forced the end 72B of the slot 72A into contact with the stop member 90A, thereby fixing the end of the tether, web or strap 72 that is coupled to the slidable bracket 72 to the housing 44 of the device 40 and, effectively, to the seat frame 18 of the vehicle seat 12 as described above. As the web guide 126 continues to travel away from the ends 136A, 136B of the channels 136, 137 and toward the ends 136B, 137B of the channels 136, 137 respectively of the housing 44 due to continued expulsion of pressurized gas from the nozzle or orifice 122 of the actuated inflator piston 120, the web guide 126 acting on the tether, web or strap 82, further displaces the tether, web or strap 82 laterally within the channel 44E of the housing 40 as illustrated in FIG. 7B. Because one end of the tether, strap or web 82 is effectively anchored to the seat frame 18 and the opposite end of the tether, strap or web 82 is anchored by the bracket 186 to the floor 16 or other support structure of the motor vehicle in which the vehicle seat 12 is mounted, such lateral displacement of the tether, strap or web 82 draws the seat frame 18, and thus the entire seat portion 25, downwardly toward the floor 16 or other support structure until the seat frame 18 reaches the seat base 14 or reaches the end of its allowable travel prior to reaching the seat base 14 as illustrated in FIGS. 7B and 7C. Illustratively, the various components are sized and configured such that the seat frame 18 reaches the lower end of its travel as the forward ends of the guide members 142A, 142B reach the ends 136A, 137A of the channels 136, 137.

As best seen in FIG. 7B, passing the tether, web or strap 82 about the web guide 126 and also about the sleeve or collar 62 creates a loop via which the tether, web or strap 82 passes in opposite directions. Such a loop is illustratively advantageous in that it reduces by approximately 2 the length of linear travel required of the inflator piston 120 in order to draw the seat frame 14 from its uppermost position, e.g., illustrated in FIGS. 1, 4A-4D and 5B, to its lowermost position, e.g., illustrated in FIGS. 7B and 7C. Such a loop is not strictly required, however, and in some alternative embodiments is omitted. In other alternative embodiments, the position of the sleeve or collar 62 and/or the length of the inflator piston 120 and/or the size of the web guide 126 may be modified to increase or decrease the factor by which the length of linear travel required of the inflator piston 120 is reduced in order to draw the seat frame 14 from its uppermost to its lowermost position. In still other alternative embodiments, the device 40 may be modified to include one or more additional loops to further reduce the length of linear travel required of the inflator piston 120 in order to draw the seat frame 14 from its uppermost position to its lowermost position.

The device 40 illustrated in FIGS. 1-7D and described herein may be alternatively implemented in embodiments of the vehicle seat 12 in which the seat portion 25 of the vehicle seat 12 is a suspended seat portion but in which the pre-tensioning phase is accomplished by another system or device external to the device 40 or is omitted altogether. In either case, the device 40 may be accordingly modified to omit the pre-tensioning phase, e.g., by rigidly securing the bracket 72, cable 80 and/or buckle 42 to the end of the tether, web or strap 82 opposite the end affixed to the anchor bracket 186, or to omit the bracket 72 and cable 80 and rigidly secure directly (or indirectly) to the housing 44 the end of the tether, web or strap 82 opposite the end affixed to the anchor bracket 186. In such embodiments, the device 40 is operable, e.g., as described with respect to FIGS. 7A-7D, to, immediately upon activation of the actuator 130, draw the seat portion 25 of the vehicle seat 12 downwardly toward the floor 16 or other support structure to which the seat 12 is mounted until the seat frame 18 reaches the seat base 14 or reaches the end of its allowable travel prior to reaching the seat base 14.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, while the device 40 has been illustrated and described as being mounted to the seat frame 18 of the seat 12 with the brackets 182B, 184B and 186 anchoring the tethers or webs 180A, 180B and 82 respectively to the floor 16 of the motor vehicle, it will be understood that this disclosure contemplates alternate embodiments in which the device 40 is instead mounted to the floor 16 of the vehicle and/or the base 14 of the seat 12 with tether or web 82, and optionally one or more of the tethers or webs 180A, 180B, affixed to the seat frame 18 or other suitable portion of the seat portion 25 of the vehicle seat 12.

What is claimed is:

1. A device for pre-tensioning an occupant restraint harness coupled to a motor vehicle seat, the device comprising:
   an elongated housing configured to be secured to the motor vehicle seat,
   a web having a first end configured to be coupled to the restraint harness and second end, opposite the first end, configured to be secured to one of the motor vehicle seat and a support structure to which the motor vehicle seat is mounted,
   an elongated piston carried by the housing and defining a web guide at one end thereof in contact with the web between the first and second ends of the web, the piston moving along and relative to the housing in response to actuation thereof, the web guide of the moving piston displacing the web within the housing to pre-tension the occupant restraint harness,
   an elongated tube carried by the housing, the elongated tube having an open end and a closed end opposite the open end thereof, the tube sized to receive the elongated piston longitudinally therein via the open end of the tube,
   a seal disposed about the elongated piston, and
   an airtight space defined within the tube between the closed end thereof and the seal disposed about the elongated piston,
   wherein the piston is forced out of the tube in response to increased pressure within the space.

2. The device of claim 1, further comprising:
   a cable having a first end secured to one of a buckle member and a tongue member releasably engageable with a corresponding one of a tongue member and a buckle member coupled to the restraint harness, and a second end, opposite the first end of the cable, extending into the housing, and
   a bracket disposed in and slidable relative to the housing, the bracket having a first end secured to the second end of the cable and a second end, opposite the first end of the bracket, secured to the first end of the web, the bracket slidable along and within the housing as the web guide of the moving piston displaces the web to retract the cable into the housing to pre-tension the restraint harness.

3. The device of claim 2, wherein the bracket defines a slot therethrough having opposing terminal ends,
   and wherein the device further comprises a stop member affixed to the housing and extending through the slot, the bracket slidable relative to the housing between a first position in which the stop member is in contact with one of the opposing terminal ends of the slot and a second position in which the stop member is in contact with the other of the opposing terminal ends, the bracket slidable between the first and second positions, as the web guide of the moving piston displaces the web, to pre-tension the restraint harness.

4. The device of claim 1, wherein the elongated piston contains pressurized gas and defines an orifice at an end thereof opposite the end defining the web guide, the orifice open to the space defined within the tube,
   and wherein the device further comprises an actuator responsive to an activation signal to cause the piston to expel the pressurized gas from the orifice into the space to thereby force the piston out of the tube.

5. The device of claim 4, further comprising:
   a sensor configured to produce one of a roll signal and an impact signal, a processor, and
   a memory unit having instructions stored therein which, when executed by the processor, cause the processor to process the one of the roll signal and the impact signal and to produce the activation signal if the corresponding one of the roll signal indicates an imminent roll condition of a motor vehicle in which the vehicle seat is mounted and the impact signal indicates an imminent impact of the motor vehicle.

6. A device for pre-tensioning an occupant restraint harness coupled to a seat portion of a motor vehicle seat suspended above a seat base coupled to a support structure of a motor vehicle and for pulling down the suspended seat portion of the vehicle seat toward the seat base, the device comprising:
   an elongated housing configured to be secured to the suspended seat portion of the motor vehicle seat,
   a web having a first end configured to be coupled to the restraint harness and second end, opposite the first end, configured to be secured to one of the seat base and the support structure to which the seat base is coupled, and
   an elongated piston carried by the housing and defining a web guide at one end thereof in contact with the web between the first and second ends of the web, the piston moving along and relative to the housing in response to actuation thereof, the web guide of the moving piston displacing the web within the housing to first pre-tension the occupant restraint harness and to then pull the suspended seat portion toward the seat base.

7. The device of claim 6, further comprising a bracket disposed in and slidable relative to the housing, the bracket having a first end configured to be coupled to the restraint harness and a second end, opposite the first end of the bracket, secured to the first end of the web, the bracket slidable along and within the housing as the web guide of the moving piston displaces the web from a first bracket position relative to the housing to a second bracket position relative to the housing to thereby pre-tension the restraint harness,
   and wherein continued movement of the piston along and within the housing with the bracket in the second bracket position causes the web guide to further displace the web to pull the suspended seat portion toward the seat base.

8. The device of claim 7, wherein the bracket defines a slot therethrough having opposing terminal ends,
   and wherein the device further comprises a stop member affixed to the housing and extending through the slot, the bracket slidable relative to the housing between the first bracket position in which the stop member is in contact with one of the opposing terminal ends of the slot and the second bracket position in which the stop member is in contact with the other of the opposing terminal ends, the stop member fixing the bracket in the second bracket position so that the continued movement of the piston along and within the housing with the bracket fixed in the second bracket position causes the web guide to further displace the web to pull the suspended seat portion toward the seat base.

9. The device of claim 7, further comprising a cable having a first end secured to one of a buckle member and a tongue member releasably engageable with a corresponding one of a tongue member and a buckle member coupled to the restraint harness, and a second end, opposite the first end of the cable, extending into the housing, the first end of the bracket secured to the second end of the cable.

10. The device of claim 6, further comprising a collar attached to and within the housing, the collar in contact with the web between the web guide and the second end of the web, the web guide and collar together defining a loop via which the web passes in opposite directions within the housing.

11. The device of claim 6, further comprising:
an elongated tube carried by the housing, the elongated tube having an open end and a closed end opposite the open end thereof, the tube sized to receive the elongated piston longitudinally therein via the open end of the tube,
a seal disposed about the elongated piston, and
an airtight space defined within the tube between the closed end thereof and the seal disposed about the elongated piston,
wherein the piston is forced out of the tube in response to increased pressure within the space.

12. The device of claim 11, wherein the elongated piston contains pressurized gas and defines an orifice at an end thereof opposite the end defining the web guide, the orifice open to the space defined within the tube,
and wherein the device further comprises an actuator responsive to an activation signal to cause the piston to expel the pressurized gas from the orifice into the space to thereby force the piston out of the tube.

13. The device of claim 12, further comprising:
a sensor configured to produce one of a roll signal and an impact signal,
a processor, and
a memory unit having instructions stored therein which, when executed by the processor, cause the processor to process the one of the roll signal and the impact signal and to produce the activation signal if the corresponding one of the roll signal indicates an imminent roll condition of the motor vehicle and the impact signal indicates an imminent impact of the motor vehicle.

14. A device for pulling down a seat portion of a motor vehicle seat toward a seat base coupled to a support structure of a motor vehicle, the seat portion suspended above the seat base, the device comprising:
an elongated housing configured to be secured to the suspended seat portion of the motor vehicle seat,
a web having a first end fixed to the suspended seat portion and second end, opposite the first end, configured to be secured to one of the seat base and the support structure to which the seat base is coupled,
an elongated piston carried by the housing and defining a web guide at one end thereof in contact with the web between the first and second ends of the web, the piston moving along and relative to the housing in response to actuation thereof, the web guide of the moving piston displacing the web within the housing to pull the suspended seat portion toward the seat base,
an elongated tube carried by the housing, the elongated tube having an open end and a closed end opposite the open end thereof, the tube sized to receive the elongated piston longitudinally therein via the open end of the tube,
a seal disposed about the elongated piston, and
an airtight space defined within the tube between the closed end thereof and the seal disposed about the elongated piston,
wherein the elongated piston contains pressurized gas and defines an orifice at an end thereof opposite the end defining the web guide, the orifice open to the space defined within the tube,
and wherein the device further comprises an actuator responsive to an activation signal to cause the piston to expel the pressurized gas from the orifice into the space to thereby force the piston out of the tube.

15. The device of claim 14, further comprising a collar attached to and within the housing, the collar in contact with the web between the web guide and the second end of the web, the web guide and collar together defining a loop via which the web passes in opposite directions within the housing.

16. The device of claim 14, further comprising:
a sensor configured to produce one of a roll signal and an impact signal,
a processor, and
a memory unit having instructions stored therein which, when executed by the processor, cause the processor to process the one of the roll signal and the impact signal and to produce the activation signal if the corresponding one of the roll signal indicates an imminent roll condition of a motor vehicle in which the vehicle seat is mounted and the impact signal indicates an imminent impact of the motor vehicle.

17. A system for pre-tensioning a motor vehicle occupant restraint harness, the system comprising:
a motor vehicle seat having a seat portion coupled to a seat base, the seat base configured to be mounted to a support structure within a motor vehicle,
an occupant restraint harness coupled to the motor vehicle seat,
an elongated housing secured to the seat portion of the motor vehicle seat,
a web having a first end extending into the housing and coupled to the restraint harness and second end, opposite the first end, secured to one of the seat base and the support structure,
a piston carried by the housing and having a web guide in contact with the web between the first and second ends of the web,
an actuator responsive to an activation signal to actuate the piston to cause the piston and web guide to move within and relative to the housing to pre-tension the occupant restraint harness by displacing the web,
a sensor configured to produce one of a roll signal and an impact signal,
a processor,
a memory unit having instructions stored therein which, when executed by the processor, cause the processor to process the one of the roll signal and the impact signal and to produce the activation signal if the corresponding one of the roll signal indicates an imminent roll condition of the motor vehicle and the impact signal indicates an imminent impact of the motor vehicle,
wherein the piston is an elongated piston,
an elongated tube carried by the housing, the elongated tube having an open end and a closed end opposite the open end thereof, the tube sized to receive the elongated piston longitudinally therein via the open end of the tube,
a seal disposed about the elongated piston, and
an airtight space defined within the tube between the closed end thereof and the seal disposed about the elongated piston,
wherein the elongated piston contains pressurized gas and defines an orifice at an end thereof opposite the end defining the web guide, the orifice open to the space defined within the tube, and wherein the actuator is responsive to the activation signal to cause the piston to expel the pressurized gas from the orifice into the space to thereby force the piston out of the tube.

18. The system of claim 17, wherein the seat portion is suspended above the seat base, and wherein the system further comprises a bracket disposed in and slidable relative to the housing, the bracket having a first end coupled to the restraint harness and a second end, opposite the first end of the bracket, secured to the first end of the web, the bracket slidable along and within the housing as the web guide of the moving piston displaces the web from a first bracket position relative to the housing to a second bracket position relative to the housing to thereby pre-tension the restraint harness, and wherein continued movement of the piston along and within the housing with the bracket in the second bracket position causes the web guide to further displace the web to pull the suspended seat portion toward the seat base.

\* \* \* \* \*